US011865548B2

(12) United States Patent
McKenzie et al.

(10) Patent No.: US 11,865,548 B2
(45) Date of Patent: Jan. 9, 2024

(54) SPIRAL SEPARATORS AND PARTS THEREFORE

(71) Applicant: OREKINETICS INVESTMENTS PTY LTD, Brisbane (AU)

(72) Inventors: Ezra McKenzie, Brisbane (AU); Peter Gates, Brisbane (AU)

(73) Assignee: OREKINETICS INVESTMENTS PTY LTD, Brisbane (AU)

( * ) Notice: Subject to any disclaimer, the term of this patent is extended or adjusted under 35 U.S.C. 154(b) by 88 days.

(21) Appl. No.: 17/310,593

(22) PCT Filed: Dec. 19, 2019

(86) PCT No.: PCT/AU2019/051413
§ 371 (c)(1),
(2) Date: Aug. 12, 2021

(87) PCT Pub. No.: WO2020/163893
PCT Pub. Date: Aug. 20, 2020

(65) Prior Publication Data

US 2022/0168749 A1 Jun. 2, 2022

(30) Foreign Application Priority Data

Feb. 15, 2019 (AU) ................................ 2019900497

(51) Int. Cl.
*B03B 5/62* (2006.01)

(52) U.S. Cl.
CPC .................................... *B03B 5/626* (2013.01)

(58) Field of Classification Search
CPC .... B03B 5/26; B03B 5/28; B03B 5/30; B03B 5/32; B03B 5/38; B03B 5/40; B03B 5/52;
(Continued)

(56) References Cited

U.S. PATENT DOCUMENTS 2,700,469 A * 1/1955 Humphreys ............ B03B 5/626
209/494
4,189,378 A * 2/1980 Wright .................... B03B 5/626
209/494
(Continued)

FOREIGN PATENT DOCUMENTS

CN 205288665 U * 6/2016
CN 205288665 U 6/2016
(Continued)

OTHER PUBLICATIONS

International Search Report and Written Opinion received for PCT/AU2019/051413, dated Mar. 31, 2020.

*Primary Examiner* — Gene O Crawford
*Assistant Examiner* — Muhammad Awais
(74) *Attorney, Agent, or Firm* — Greer, Burns & Crain, Ltd

(57) ABSTRACT

A spiral separator for separating more-desired material from less-desired material has a feed arrangement for feeding a slurry of mixed more-desired material and less-desired material, a spiral trough, and a splitting arrangement for off-take of a concentrate band of more desired material, and the spiral trough is configured to provide an effective cross-trough floor slope of less than 8 degrees to horizontal in a turn immediately upstream of the splitting arrangement. The separator may be a multi-stage separator and include a slurry preparation apparatus between each pair of stages.

19 Claims, 18 Drawing Sheets

(58) Field of Classification Search
CPC .......... B03B 5/62; B03B 5/626; B07B 13/11; B65G 11/06
USPC .................................................. 209/725, 459
See application file for complete search history.

(56) References Cited

U.S. PATENT DOCUMENTS

| | | | | | |
|---|---|---|---|---|---|
| 4,277,330 | A * | 7/1981 | Wright | B03B 5/626 | 209/459 |
| 4,324,334 | A * | 4/1982 | Wright | B03B 5/626 | 209/459 |
| 4,384,650 | A * | 5/1983 | Wright | B03B 5/626 | 209/459 |
| 4,476,980 | A * | 10/1984 | Giffard | B03B 5/626 | 209/459 |
| 4,545,900 | A * | 10/1985 | Wright | B03B 5/626 | 209/459 |
| 4,553,673 | A * | 11/1985 | Wright | B03B 5/626 | 209/494 |
| 4,563,279 | A * | 1/1986 | Wright | B03B 5/626 | 210/512.1 |
| 4,597,861 | A * | 7/1986 | Wright | B03B 5/626 | 209/459 |
| 4,664,789 | A * | 5/1987 | Lees | B03B 5/626 | 209/931 |
| 4,795,553 | A * | 1/1989 | Giffard | B03B 5/626 | 209/459 |
| 4,836,926 | A * | 6/1989 | Grobler | B03B 5/626 | 210/512.1 |
| 5,472,096 | A * | 12/1995 | Prinsloo | B03B 5/626 | 209/459 |
| 5,535,892 | A * | 7/1996 | Moorhead | B03B 5/626 | 209/208 |
| 6,336,559 | B1 * | 1/2002 | Knoll | B03B 5/626 | 209/458 |
| 7,296,686 | B2 * | 11/2007 | Grey | B03B 5/626 | 209/459 |
| 8,813,971 | B2 * | 8/2014 | Cooke | B03B 5/626 | 209/459 |
| 2011/0186487 | A1 * | 8/2011 | Cooke | B03B 5/626 | 209/459 |
| 2013/0092272 | A1 * | 4/2013 | Cooke | B03B 5/626 | 251/319 |

FOREIGN PATENT DOCUMENTS

| | | | | |
|---|---|---|---|---|
| CN | 105903549 | A * | 8/2016 | B03B 5/626 |
| GB | 456432 | | 8/1935 | |
| GB | 456432 | A * | 8/1935 | |
| KR | 20100013474 | A * | 2/2010 | |

* cited by examiner

SPIRAL SEPARATORS AND PARTS THEREFORE

BACKGROUND

The present disclosure relates to spiral separators and especially, but not exclusively to spiral separators for wet gravity separation of desired mineral materials from undesired mineral materials in circumstances where the desired and undesired materials have different specific gravities. The disclosure extends to parts or components of spiral separators, and to related methods.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Spiral separators are extensively used for the wet gravity separation of particulate solids according to their specific gravity.

A known type of spiral separator comprises one or more helical sluices, often referred to as spirals or spiral troughs, mounted on a central column which is vertical in use. Spiral separators with two or more intertwined helical troughs are known as double- or multiple-start separators. A feed arrangement is provided for feeding a mineral/water slurry to the uppermost part of the, or each, spiral trough. The slurry is induced, by gravity, to flow down the spiral. The particulates in the slurry are subject to a number of different forces, including gravitational force, drag forces due to contact with the spiral, and centrifugal force due to movement along a generally helical path. Broadly speaking, particles with higher specific gravity move toward the radially inner part of the spiral, and particles with lower specific gravity (lower density) move towards the outer parts of the spiral. Suitably distributed off-take openings or channels collect streams of particulates which have undergone this separation. However, further separation processing is often required.

Spiral separators have been used commercially since the early to mid-1900s. Early commercial spiral separators were quite unsophisticated, using substantially uniform spirals, that is, spirals in which both the pitch and the profile were uniform and did not vary between different turns of a spiral trough.

Significant contributions to the effectiveness and efficiency of spiral separators were made by Douglas Charles Wright in the early 1980's. One substantial contribution was invention of a spiral separator in which the (or each) spiral trough was not uniform over all the successive turns, but rather had a cross-sectional profile which was different in different turns.

U.S. Pat. No. 4,324,334 describes a spiral separator in which the profile of the spiral varies in a specific progression over successive turns, in a manner that was found to improve separation performance compared to use of a uniform trough. This patent describes a spiral separator in which each helical trough has a floor or trough bottom which is substantially straight in radial cross section, and inclined in radial cross section, being lower at its more inward part and higher at its more outward part. The change in profile of the trough, through different turns, is described by reference to a varying cross sectional angle 'A' of the spiral bottom to horizontal. The varying cross sectional angle of the spiral (trough) bottom is described as being about 21 degrees in the first 3.5 turns of the spiral, then reducing, below these upper turns, to about 15° in the fourth turn, then to about 12° in the fifth turn, and then being further reduced to about 9° for the sixth and final turn.

Another, related, US patent to Douglas Wright, U.S. Pat. No. 4,563,279, describes a trough shape in which the sloping trough bottom, or floor, has a more inner straight region and a more outer straight region, the more outer straight region having a uniform cross sectional angle, to horizontal, of about 21 degrees, and the more inner straight region having a varying cross sectional angle described as being about 21 degrees in the first two complete turns of the spiral, then reducing, below these upper turns, to about 15° in the third turn, then to about 12° in the fourth turn, and then being further reduced to about 9° for the fifth and final turn.

The decrease from 21 degrees to 9 degrees was evidently considered particularly important by Wright, with this feature being recited in seven of the sixteen claims of U.S. Pat. No. 4,563,279.

The varying cross sectional angle of the trough bottom is described in U.S. Pat. Nos. 4,324,334 and 4,563,279, as providing a braking effect on the flow of material, and particularly on the flow of material near to the inside of the spiral, resulting in a spreading of the innermost stratum of pulp.

It is believed that substantially all high-performance wet spiral concentrators recently made and sold commercially worldwide, at least for separation of desired heavy minerals from undesired mineral with a lower specific gravity, such as silica sand, have incorporated the concepts taught by Wright in the early 1980s. It is also believed that substantially all high-performance wet spiral concentrators recently made and sold commercially worldwide have used spirals of about 5 to 7 turns, or in the case of multiple stage separators, about 5 to 7 turns per stage.

The reference to prior art or other background in this specification is not, and should not be taken as, an acknowledgment or any form of suggestion that the referenced prior art or other background forms part of the common general knowledge in Australia or in any other country

SUMMARY

According to a first aspect of the present disclosure there is provided a spiral separator for separating more-desired material from less-desired material, the spiral separator comprising:

- a feed arrangement for feeding a slurry of mixed more-desired material and less-desired material;
- a spiral trough; and
- a splitting arrangement for off-take of a concentrate band of more desired material;
- wherein the spiral trough is configured to provide a trough floor region with an effective cross-trough floor slope which reduces by between 5 and 8 degrees in a turn immediately upstream of the splitting arrangement.

In an embodiment at least some of the turn immediately upstream of the splitting arrangement comprises a concentrate refiner region, in which a concentrate band of the slurry is refined by radially outward migration of less-desired material from the concentrate band.

In an embodiment the trough is configured to provide a trough floor region with an effective cross-trough floor slope of between 4 and 8 degrees from horizontal in a turn immediately upstream of the splitting arrangement.

In an embodiment the trough is configured to provide a feed transition zone proximal to the feed arrangement.

In an embodiment the at least part of the feed transition zone provides a floor region with an effective cross-trough floor slope of between 16 and 20 degrees from horizontal.

In an embodiment the floor region with an effective cross-trough floor slope of between 16 and 20 degrees from horizontal is provided within 1.5 turns of the feed arrangement.

In an embodiment the feed transition zone is provided within 1.5 turns of the feed arrangement.

In an embodiment the feed transition zone terminates within 1.5 turns of the feed arrangement.

In an embodiment the feed transition zone provides a region in which a cross sectional shape of the trough transitions gradually from providing a relatively narrow feed entry channel, adjacent a radially outer part of the trough, to providing a substantially full width floor profile with an effective cross-trough floor slope of between about 15 and about 20 degrees.

In an embodiment the relatively narrow feed entry channel has a floor part with cross-trough floor slope less than 12 degrees.

In an embodiment the relatively narrow feed entry channel has a floor part with cross-trough floor slope less than 5 degrees.

In an embodiment the trough is configured to provide an effective cross-trough floor slope which reduces at a mean rate of between 2 and 4 degrees per turn for at least one further turn downstream of the feed transition zone.

In an embodiment the trough is configured to provide an effective cross-trough floor slope which reduces at a mean rate of between 2 and 4 degrees per turn for at least two further turns downstream of the feed transition zone.

A region in which an effective cross-trough floor slope which reduces at a mean rate of between 2 and 4 degrees, and which is downstream of the feed transition zone and upstream of the concentrate refiner region may be considered an intermediate zone.

In an embodiment the effective cross-trough floor slope is the slope of a straight line which extends radially between radially inner and radially outer parts of a trough floor surface on which separation occurs.

In an embodiment the effective cross-trough floor slope is the slope of a straight line which extends radially between radially inner and radially outer parts of a trough floor surface on which separation occurs, wherein the radially inner part is a part where the floor surface meets a radially inner wall.

In an embodiment the effective cross-trough floor slope is the slope of a straight line which extends radially between radially inner and radially outer parts of a trough floor surface on which separation occurs, wherein the radially outer part of the trough floor surface is a part where the floor surface meets a radially outer upstanding wall of the trough.

In an embodiment the line which extends radially between radially inner and radially outer parts of a trough floor surface on which separation occurs is substantially coincident with the actual trough floor surface. In other embodiments the actual trough floor surface deviates from the line, for example having a curved profile, or a profile comprising two or more straight segments which meet at a point which is not on the line.

In an embodiment the trough extends between about two turns and about five turns between a slurry feed point and a concentrate off-take point.

In an embodiment the trough extends between about 2.5 turns and about 4.5 turns between a slurry feed point and a concentrate off-take point.

In an embodiment the trough extends between about three turns and about four turns between a slurry feed point and a concentrate off-take point.

In an embodiment the trough extends about 3.5 turns between a slurry feed point and a concentrate off-take point.

In an embodiment the trough is in the form of a modular trough unit, providing between about 2.5 turns and about 4.5 turns.

In an embodiment the trough provides an upstream coupling configuration at a more upstream part thereof for coupling to a more upstream part of a separator.

In an embodiment the upstream coupling configuration comprises a flange arrangement.

In an embodiment the trough provides a downstream coupling configuration at a more downstream part thereof for coupling to a more downstream part of a separator.

In an embodiment the downstream coupling configuration comprises a flange arrangement.

In an embodiment the trough provides a helical pitch of between 35 and 50 cm.

In an embodiment the trough has a helical diameter of between 50 and 75 cm.

In an embodiment the trough has a helical diameter of between 60 and 65 cm.

In an embodiment the spiral separator is a spiral separator for wet gravity separation of minerals.

In an embodiment the spiral separator is a spiral separator for wet gravity separation of heavy minerals from silica sand.

In an embodiment the spiral separator comprises at least two stages, at least two stages each comprising: a feed arrangement for feeding a slurry of mixed more-desired material and less-desired material; a spiral trough; a splitting arrangement for off-take of a concentrate band of more desired material; and wherein in at least two stages the spiral trough is configured as defined above in relation to the first aspect.

In an embodiment at least a second stage is provided substantially below a first stage.

In an embodiment the feed arrangement of at least one second or subsequent stage comprises a slurry preparation apparatus.

In an embodiment the slurry preparation apparatus comprises a mixing region for mixing material from a more fluid stream of a slurry flow exiting a more upstream stage with material from a less fluid stream of the slurry flow exiting the more upstream stage prior to feeding mixed prepared slurry into said second or subsequent stage.

In an embodiment the slurry preparation apparatus comprises an energy dissipation region to reduce kinetic energy of at least a substantial amount of material from a more fluid stream of a slurry flow exiting a more upstream stage, to thereby reduce the downstream velocity of said at least part of the more fluid stream.

In an embodiment the slurry preparation apparatus is in accordance with at least one of the aspects of the present disclosure relating to a slurry preparation apparatus.

According to a second aspect of the present disclosure there is provided a spiral separator for separating more-desired material from less-desired material, the spiral separator comprising:

- a feed arrangement for feeding a slurry of mixed more-desired material and less-desired material;
- a spiral trough; and
- a splitting arrangement for off-take of a concentrate band of more desired material;

wherein the spiral trough is configured to provide an effective cross-trough floor slope of less than 8 degrees to horizontal in a turn immediately upstream of the splitting arrangement.

In an embodiment the spiral separator comprises at least two stages, at least two stages each comprising: a feed arrangement for feeding a slurry of mixed more-desired material and less-desired material; a spiral trough; a splitting arrangement for off-take of a concentrate band of more desired material; and wherein in at least two stages the spiral trough is configured as defined above in relation to the second aspect.

In an embodiment at least a second stage is provided substantially below a first stage.

In an embodiment the feed arrangement of a second or subsequent stage comprises a slurry preparation arrangement.

In an embodiment the slurry preparation arrangement comprises a slurry preparation apparatus comprising a mixing region for mixing material from a more fluid stream of a slurry flow exiting a more upstream stage with material from a less fluid stream of the slurry flow exiting the more upstream stage prior to feeding mixed prepared slurry into said second or subsequent stage. In an embodiment the slurry preparation arrangement comprises a slurry preparation apparatus in accordance with an aspect of the present disclosure.

According to a third aspect of the present disclosure there is provided a spiral separator for providing at least partial separation of a first species and a second species, comprising:

- a feed arrangement;
- a spiral trough comprising a more upstream region and a more downstream region;
- a splitting arrangement;
- wherein the feed arrangement is, in use, arranged to feed a feed slurry comprising a mix of said first species and said second species into the more upstream region of the spiral trough at a feed entry region;
- wherein the more upstream region of the spiral trough has a trough floor region, and provides an effective cross-trough floor slope relative to the horizontal, which reduces from between 15 and 20 degrees to a cross-trough floor angle of between 10 degrees and 14 degrees;
- wherein the more downstream region of the spiral trough has a trough floor region having an effective cross-trough floor angle which reduces to between 4 degrees and 8 degrees, relative to the horizontal; and
- wherein the splitting arrangement is provided at or immediately adjacent the more downstream region, to split a concentrated band of the first species from the rest of the flow in the spiral trough.

In an embodiment a downstream end of the more upstream region is connected to an upstream end of the more downstream region.

In an embodiment a downstream end of the more upstream region is contiguous with an upstream end of the more downstream region.

In an embodiment a downstream end of the more upstream region is continuous with an upstream end of the more downstream region.

In an embodiment in the more upstream region of the spiral trough at least part of a region which has said effective cross-trough floor angle relative to the horizontal, of between 15 and 20 degrees is provided at a position within 1.5 turns from the feed entry region.

In an embodiment, in the more upstream region of the spiral trough said reduction in effective cross-trough floor angle occurs at rate of between 2 degrees reduction in angle and 4 degrees reduction in angle, over at least one turns of the more upstream region of the spiral trough.

In an embodiment, in the more upstream region of the spiral trough said reduction in effective cross-trough floor angle occurs at rate of between 2 degrees reduction in angle and 4 degrees reduction in angle, over each of at least two turns of the more upstream region of the spiral trough.

In an embodiment the spiral separator comprises at least two stages, at least two stages each comprising: a feed arrangement for feeding a slurry of mixed more-desired material and less-desired material; a spiral trough; a splitting arrangement for off-take of a concentrate band of more desired material; and wherein in at least two stages the spiral trough is configured as defined above in relation to the third aspect.

In an embodiment at least a second stage is provided substantially below a first stage.

In an embodiment the feed arrangement of a second or subsequent stage comprises a slurry preparation arrangement. In an embodiment the slurry preparation arrangement comprises a slurry preparation apparatus comprising a mixing region for mixing material from a more fluid stream of a slurry flow exiting a more upstream stage with material from a less fluid stream of the slurry flow exiting the more upstream stage prior to feeding mixed prepared slurry into said second or subsequent stage. In an embodiment the slurry preparation arrangement comprises a slurry preparation apparatus in accordance with an aspect of the present disclosure.

According to a fourth aspect of the present disclosure there is provided a spiral separator for separating more-desired material from less-desired material, the spiral separator comprising:

- a feed arrangement for feeding a slurry of mixed more-desired material and less-desired material;
- a spiral trough;
- a splitting arrangement for off-take of a concentrate band of more desired material; and
- wherein the spiral trough is configured to provide a trough floor with an effective cross-trough floor slope which reduces between an upstream region thereof and a downstream region thereof, and wherein the reduction in effective cross-trough floor slope in a turn immediately upstream of the splitting arrangement is provided by the pitch of a more radially outer region of the spiral trough and the pitch of a more radially inner region of the trough being different over said turn of the spiral trough, and wherein the difference in pitch over said turn is between 0.08 and 0.18 times the radial distance between said more radially outer region and said more radially inner region.

In an embodiment, the difference in pitch over said turn is between 0.9 and 0.14 times the radial distance between said more radially outer region and said more radially inner region.

In an embodiment, the difference in pitch over said turn is between 0.95 and 0.12 times the radial distance between said more radially outer region and said more radially inner region.

In an embodiment the turn immediately upstream of the splitting arrangement provides a refiner region of the trough, and the trough provides least one turn upstream of the refiner region over which the pitch of a more radially outer region and the pitch of a more radially inner region are different, and wherein the difference in pitch over said turn is less than 0.08 times the radial distance between said more radially outer region and said more radially inner region.

In an embodiment the turn immediately upstream of the splitting arrangement provides a refiner region of the trough, and the trough provides least one turn upstream of the refiner region over which the pitch of a more radially outer region and the pitch of a more radially inner region are different, and wherein the difference in pitch over said turn, expressed as a multiple of radial distance between more radially outer and more radially inner regions, is less than that in the refiner region.

In an embodiment the spiral separator comprises at least two stages, at least two stages each comprising: a feed arrangement for feeding a slurry of mixed more-desired material and less-desired material; a spiral trough; a splitting arrangement for off-take of a concentrate band of more desired material; and wherein in at least two stages the spiral trough is configured as defined above in relation to the fourth aspect.

According to a fifth aspect of the present disclosure there is provided a spiral separator for separating a more-desired material from a less-desired mineral of a feed slurry containing said more-desired and less-desired materials, wherein the less-desired material has a specific gravity less than that of the more-desired material, the spiral separator comprising:

- a feed arrangement;
- a spiral trough comprising a more upstream region and a more downstream region;
- a splitting arrangement;
- wherein the feed arrangement is, in use, arranged to feed a feed slurry of the more-desired and less-desired materials into the more upstream region of the spiral trough;
- wherein the more upstream region of the spiral trough has a trough floor region, and provides one or more effective cross-trough floor angles relative to the horizontal, to thereby provide a preliminary concentrate band in which some of the less-desired mineral is mixed with concentrated more-desired material;
- wherein the more downstream region of the spiral trough has at least one floor region, having a cross-trough floor angle configured to provide a refiner region where a balance of centrifugal and gravitational forces on the concentrate band is such that both the more-desired and less-desired materials would, if the balance of forces were maintained, migrate outwardly;
- wherein the apparatus provides a refinement part of the refiner region at which least some of the less-desired material has migrated outwardly from a radial position corresponding to that of the preliminary concentrate band, and at which no substantial amount of the more-desired material has migrated substantially outwardly due to the balance of centrifugal and gravitational forces, so that a refined concentrate band is provided at the refinement part; and
- wherein the splitting arrangement is provided at or immediately downstream of the refinement part to split the refined concentrate band from the rest of the slurry in the spiral trough.

In an embodiment said cross-trough floor angle which is configured to provide said refiner part region is smaller than a cross-trough floor angle of a radially corresponding region of the more upstream part of the trough.

In an embodiment the trough is configured to provide an effective cross-trough floor angle in the refiner part which is substantially smaller than the smallest effective cross-trough floor angle in the more upstream region.

In an embodiment the spiral separator is for separation of more desired particulate mineral from a less-desired particulate mineral.

In an embodiment the spiral separator is for separation of more desired heavy mineral from a less-desired silica sand.

In an embodiment the trough is configured to provide an effective cross-trough floor angle in the refiner region which is at least 5 degrees smaller than the smallest effective cross-trough floor angle in the more upstream region.

In an embodiment the trough is configured to provide an effective cross-trough floor angle in the refiner region which is at least 5 degrees smaller than the effective cross-trough floor angle one turn upstream of the refiner region.

In an embodiment the feed arrangement is connected to the more upstream part of the spiral trough.

In an embodiment the spiral separator comprises at least two stages, at least two stages each comprising: a feed arrangement for feeding a slurry of mixed more-desired material and less-desired material; a spiral trough; a splitting arrangement for off-take of a concentrate band of more desired material; and wherein in at least two stages the spiral trough is configured as defined above in relation to the fifth aspect.

In an embodiment at least a second stage is provided substantially below a first stage.

In an embodiment the feed arrangement of a second or subsequent stage comprises a slurry preparation apparatus.

According to a sixth aspect of the present disclosure there is provided a method for separating a first species from a second species of a feed slurry containing said first and second species, wherein the second species has a specific gravity less than that of the first species, the method comprising:

- feeding a feed slurry of the first and second species down a trough of a spiral separator, wherein an effective cross-trough floor slope of the trough, relative to horizontal, reduces relatively gradually over at least one more-upstream turn of the trough, and wherein the effective cross-trough floor slope of the trough reduces relatively rapidly over a more downstream turn of the trough, and
- providing a take-off opening at or adjacent said more downstream turn of the trough.

In an embodiment, the method comprises:

- providing the trough such that during movement of the slurry along said at least one more upstream turn of the trough a higher proportion of said first species than of said second species migrates to a radially inward region of the trough to form a preliminary concentrate band containing both said first and second species, wherein the proportion of the first species to second species is substantially higher than in the feed slurry; and
- wherein the relatively rapid reduction in effective cross-trough floor slope in said more downstream turn results in a more rapid migration of said second species than of said first species, outwardly from said preliminary concentrate stream, to leave an improved concentrate stream, wherein the proportion of the first species to second species is higher than in the preliminary concentrate stream, at a radially inward region of the more downstream turn.

In an embodiment, the method comprises splitting all or part of the improved concentrate band from the rest of the slurry.

In an embodiment, the method comprises segregating all or part of the improved concentrate band from the rest of the slurry via the take-off opening.

In an embodiment the take-off opening is at least partially defined by a splitter member.

In an embodiment the splitter member is moveable to allow adjustment of the size of the take-off opening.

In an embodiment, in at least some of the more downstream part, the effective cross-trough floor slope, relative to the horizontal, is less than 8 degrees.

In an embodiment the method comprises use of a spiral separator in accordance with at least one of the first to fifth aspects.

In an embodiment the method comprises use of a spiral separator having at least two separation stages.

In an embodiment the method comprises providing a slurry preparation apparatus between two successive stages.

In an embodiment the slurry preparation apparatus comprises a mixing region for mixing material from a more fluid stream of a slurry flow exiting a more upstream stage with material from a less fluid stream of the slurry flow exiting the more upstream stage prior to feeding mixed prepared slurry into said second or subsequent stage. In an embodiment the slurry preparation apparatus comprises a slurry preparation apparatus in accordance with an aspect of the present disclosure.

According to a seventh aspect of the present disclosure there is provided a slurry preparation apparatus for preparing a slurry from an upstream spiral trough region of a spiral separator, in which the slurry comprises a more fluid stream and a less fluid stream, for entry to a downstream spiral trough region as a prepared mixed slurry, the slurry preparation apparatus comprising:

- an inlet region for ingress of received slurry from an upstream trough region;
- an outlet region for providing prepared mixed slurry to a downstream spiral trough region;
- an energy dissipation region to reduce kinetic energy of at least a substantial amount of material from the more fluid stream, to thereby reduce the downstream velocity of said at least part of the more fluid stream before the prepared mixed slurry exits the outlet region; and
- a mixing region for mixing material from the more fluid stream with material from the less fluid stream.

In an embodiment, the slurry preparation apparatus, by virtue of reducing the kinetic energy of material from the more fluid stream and mixing material from the more fluid and less fluid streams, is adapted to provide a prepared slurry from the outlet region, in which said prepared slurry is substantially the same in its characteristics of fluid/particulate distribution and downstream velocity as a typical slurry fed from a feedbox onto an upstream part of a trough of a spiral separator.

In an embodiment, the slurry preparation apparatus, by virtue of reducing the kinetic energy of material from the more fluid stream and mixing material from the more fluid and less fluid streams, is adapted to provide a prepared slurry from the outlet region, in which the more fluid stream and less fluid stream are thoroughly mixed and in which the prepared slurry has low outlet velocity.

In an embodiment the apparatus is configured such that the down trough progress of the less fluid stream is continues substantially unimpeded throughout by reflux of water or pulp upstream, dewatering or direction changes on the trough floor that may initiate sanding.

In an embodiment the apparatus is configured such that the down trough progress of the material from the less fluid stream is, at least until the mixing of said material from the less fluid stream with material from the more fluid stream in the mixing region, unimpeded by reflux of water or pulp upstream, dewatering within the slurry preparation apparatus, or direction changes on the trough floor that may initiate sanding.

In an embodiment the slurry preparation apparatus comprises a trough floor part to receive and convey material from the less fluid stream, from the inlet region.

In an embodiment, the slurry preparation apparatus comprises a passageway for passage of at least part of the received slurry along at least part of a route between the inlet region and the outlet region, wherein the passageway provides a floor region which has a downstream slope and wherein said floor region of the passageway is configured to provide the apparatus with a drop region providing a vertically downward acceleration of at least some material from the more fluid stream to facilitate mixing of the more fluid stream with the less fluid stream in the mixing region.

In an embodiment, the floor region has a downstream slope which is different to the downstream slope of the upstream spiral trough region.

In an embodiment, the floor region has a downstream slope which is different to the downstream slope of the upstream spiral trough region at a corresponding radial position.

In an embodiment, the floor region has a downstream slope which is different to the downstream slope of the upstream spiral trough region at a part of the upstream spiral trough region proximal to the slurry preparation apparatus.

In an embodiment the floor region comprises a ramp region which extends at a greater angle of elevation, in a downstream direction, than does a trough floor part of the slurry preparation apparatus.

In an embodiment the floor region of the passageway comprises a ramp region to elevate said at least some material from the more fluid stream relative to material from the less fluid stream.

In an embodiment the passageway provides a drop region by termination of said floor region of the passageway.

In an embodiment the drop region provides a region at which at least some of the material from the more fluid stream falls onto at least some of the material from the less fluid stream.

In an embodiment the drop region provides a region at which a stream of material from the more fluid stream falls onto at a stream of material from the less fluid stream.

In an embodiment the energy dissipation region is provided before or substantially at the drop region.

In an embodiment the slurry preparation apparatus is configured to act upon material from the more fluid stream to reduce the kinetic energy, in the energy dissipation region, before said material from the more fluid stream mixes with the material from the less fluid stream in the mixing region.

In an embodiment the slurry preparation apparatus is configured to provide the energy dissipation region at, or upstream relative to, the mixing region.

In an embodiment the apparatus provides a first route between the inlet region and the mixing region, solely or primarily for material from the more fluid stream, and a second route between the inlet region and the mixing region, solely or primarily for material from the less fluid stream.

In an embodiment the first route is elevated relative to the second route.

In an embodiment the first route is provided at least partially by a ramp arrangement.

In an embodiment the second route is provided by a trough floor part of the apparatus.

In an embodiment the first route is provided at least partially by a compartment of the apparatus which is elevated relative to the second route.

In an embodiment the energy dissipation region comprises at least one impeding element to impede downstream flow of at least a substantial amount of material from the more fluid stream.

In an embodiment at least one impeding element comprises a baffle part.

In an embodiment at least one baffle part is provided at or substantially above a drop region of the apparatus which, in use, provides a vertically downward acceleration of at least some material from the more fluid stream to facilitate mixing.

In an embodiment material from the more fluid stream drops onto material from the less fluid stream at said drop region.

In an embodiment at least one baffle part comprises a barrier part having an upper edge and a lower edge.

In an embodiment at least one baffle part comprises a barrier part having a lower edge which is substantially free.

In an embodiment at least one baffle part comprises a barrier part having a lower edge which is substantially free and below which material may flow.

In an embodiment at least one baffle part comprises a barrier part having an upper edge by which the barrier part is supported.

In an embodiment at least one baffle part comprises at least part of a downstream wall of the apparatus.

In an embodiment at least one impeding element comprises at least part of a downstream wall of the apparatus.

In an embodiment at least one impeding element comprises a wall of said passageway.

In an embodiment the energy dissipation region comprises a convoluted or serpentine passageway region.

In an embodiment the energy dissipation region is provided downstream of the mixing region.

In an embodiment the apparatus is configured so the energy dissipation region, in use, acts on the material from the more fluid stream after it is mixed with material from the less fluid stream.

In an embodiment the mixing region comprises a converging channel region.

In an embodiment the mixing region comprises a converging channel region in which a radially outer wall of the channel region guides material from the more fluid stream inwardly towards the more fluid stream.

In an embodiment the converging channel region guides material from the more fluid stream and material from the more fluid stream into a descending conduit.

In an embodiment at least one of the converging channel and descending conduit provides a drop region which, in use, provides a vertically downward acceleration of at least some material from the more fluid stream, to facilitate mixing.

In an embodiment the drop region may also provide a vertically downward acceleration of material from the less fluid stream.

In an embodiment the energy dissipation region comprises an energy dissipation box.

In an embodiment the energy dissipation box comprises a radially outer wall portion, a radially inner wall portion, an upper wall portion providing at least part of a cover part of the energy dissipation box.

In an embodiment the energy dissipation box comprises at least one impeding element.

In an embodiment the mixing region is provided within the energy dissipation box.

According to an eighth aspect of the present disclosure there is provided a slurry preparation apparatus for preparing a slurry from an upstream spiral trough region of a spiral separator, in which the slurry comprises a more fluid stream and a less fluid stream, for entry to a downstream spiral trough region as a prepared mixed slurry, the slurry preparation apparatus comprising:

an inlet region for ingress of received slurry from an upstream trough region;

an outlet region for providing prepared mixed slurry to a downstream spiral trough region;

a passageway for passage of at least part of the received slurry along at least part of a route between the inlet region and the outlet region, wherein the passageway provides a floor region which has a downstream slope, and wherein said floor region of the passageway is configured to provide the apparatus with a drop region providing a vertically downward acceleration of at least some material from the more fluid stream to facilitate mixing of the more fluid stream with the less fluid stream between said inlet region and said outlet region; and at least one impeding element to impede downstream flow of at least some material from the more fluid stream, to thereby reduce the downstream velocity of said at least part of the more fluid stream before the prepared mixed slurry exits the outlet region.

In an embodiment, the floor region has a downstream slope which is different to the downstream slope of the upstream spiral trough region.

In an embodiment, the floor region has a downstream slope which is different to the downstream slope of the upstream spiral trough region at a, or any, radial position on the upstream spiral trough region corresponding to the radial position of the floor region.

In an embodiment, the floor region has a downstream slope which is different to the downstream slope of the upstream spiral trough region at a part of the upstream spiral trough region proximal to the slurry preparation apparatus.

In an embodiment the floor region of the passageway comprises a ramp region to elevate said at least some material from the more fluid stream relative to material from the less fluid stream.

In an embodiment the apparatus provides a trough floor region for passage of at least some material from the less fluid stream along at least part of a route between the inlet region and the outlet region.

According to a ninth aspect of the present disclosure there is provided a slurry preparation apparatus for preparing a slurry from an upstream spiral trough region of a spiral separator, in which the slurry comprises a more fluid stream and a less fluid stream, for entry to a downstream spiral trough region as a prepared mixed slurry, the slurry preparation apparatus comprising:

an inlet region for ingress of received slurry from an upstream trough region;

an outlet region for providing prepared mixed slurry to a downstream spiral trough region;

an energy dissipation box comprising a radially outer wall portion, a radially inner wall portion, an upper wall portion providing at least part of a covering part of the energy dissipation box and at least one impeding element for impeding downstream flow of at least a substantial amount of material from the more fluid stream, to reduce kinetic energy thereof and to thereby reduce the downstream velocity of said at least part of the more fluid stream before the prepared mixed slurry exits the outlet region; and a mixing region for mixing material from the more fluid stream with material from the less fluid stream.

In an embodiment the mixing region is provided within the energy dissipation box.

In an embodiment at least one impeding element comprises a baffle part.

In an embodiment the energy dissipation box comprises at least one downstream wall portion extending at least part of the way between the radially outer wall portion and the radially inner wall portion.

In an embodiment the downstream wall portion provides an opening therein for allowing prepared mixed slurry to exit the energy dissipation box.

In an embodiment the opening is provided at a of the energy dissipation box which is located at a radially outward part, with respect to an axis of the upstream spiral trough.

In an embodiment at least one baffle part is provided by at least part of the downstream wall portion.

In an embodiment the inlet region is configured to be connected to a downstream end region of the upstream spiral trough.

In an embodiment the inlet region comprises a floor region corresponding generally in shape to a floor region of a trough of a spiral separator.

In an embodiment the inlet region comprises a floor region corresponding generally in shape to a floor region of a downstream end region of the upstream spiral trough.

According to a tenth aspect of the present disclosure there is provided a slurry preparation apparatus for preparing a slurry from an upstream spiral trough region of a spiral separator, in which the slurry comprises a more fluid stream and a less fluid stream, for entry to a downstream spiral trough region as a prepared mixed slurry, the slurry preparation apparatus comprising:

an inlet region for ingress of received slurry from an upstream trough region;

an outlet region for providing prepared mixed slurry to a downstream spiral trough region;

an energy dissipation region to reduce kinetic energy of at least a substantial amount of material from the more fluid stream, to thereby reduce the downstream velocity of said at least part of the more fluid stream before the prepared mixed slurry exits the outlet region;

a mixing region for mixing material from the more fluid stream with material from the less fluid stream; and wherein the apparatus is configured such that the down trough progress of the less fluid stream is continues substantially unimpeded throughout by reflux of water or pulp upstream, dewatering or direction changes on the trough floor that may initiate sanding.

According to an eleventh aspect of the present disclosure there is provided a slurry preparation apparatus for preparing a slurry from an upstream spiral trough region of a spiral separator, in which the slurry comprises a more fluid stream and a less fluid stream, for entry to a downstream spiral trough region as a prepared mixed slurry, the slurry preparation apparatus comprising:

an inlet region for ingress of received slurry from an upstream trough region;

an outlet region for providing prepared mixed slurry to a downstream spiral trough region;

an energy dissipation region to reduce kinetic energy of at least a substantial amount of material from the more fluid stream, to thereby reduce the downstream velocity of said at least part of the more fluid stream before the prepared mixed slurry exits the outlet region;

a mixing region for mixing material from the more fluid stream with material from the less fluid stream; and wherein the apparatus is configured such that the down trough progress of the material from the less fluid stream is, at least until the mixing of said material from the less fluid stream with material from the more fluid stream in the mixing region, unimpeded by reflux of water or pulp upstream, dewatering within the slurry preparation apparatus, or direction changes on the trough floor that may initiate sanding.

According to a twelfth aspect of the present disclosure there is provided a spiral trough for use in a spiral separator in accordance with any one or more of the first to fifth aspects.

According to a thirteenth aspect of the present disclosure there is provided a spiral trough for use in a spiral separator, the spiral trough comprising an upstream region and a downstream region, wherein the spiral trough is configured to provide a trough floor region with an effective cross-trough floor slope which reduces by between 5 and 8 degrees in a turn at said downstream region.

In an embodiment the upstream region is adapted, in use, to receive a slurry of mixed more-desired material and less-desired material from a feed arrangement of said spiral separator.

The feed arrangement may comprise a feedbox of a spiral separator. In one alternative the feed arrangement may comprise an arrangement between two stages of a spiral separator which feeds slurry to a downstream stage.

In an embodiment the upstream region comprises an upstream end region of the trough.

In an embodiment the downstream region is adapted to receive or comprise a splitting arrangement of said spiral separator, and to provide said trough floor region such that the effective cross-trough floor slope reduces by between 5 and 8 degrees in a turn immediately upstream of the splitting arrangement.

In an embodiment the downstream region comprises a downstream end region of the trough.

It will be appreciated that a spiral trough in accordance with the thirteenth aspect may be for use in a spiral separator in accordance with the first aspect.

According to a fourteenth aspect of the present disclosure there is provided a spiral trough for use in a spiral separator, the spiral trough comprising an upstream region and a downstream region, wherein the spiral trough is configured to provide an effective cross-trough floor slope of less than 8 degrees to horizontal in a turn at said downstream region.

In an embodiment the upstream region is adapted, in use, to receive a slurry of mixed more-desired material and less-desired material from a feed arrangement of said spiral separator.

In an embodiment the upstream region comprises an upstream end region of the trough.

In an embodiment the downstream region is adapted to receive or comprise a splitting arrangement of said spiral separator, and to provide said effective cross-trough floor slope of less than 8 degrees to horizontal in a turn immediately upstream of the splitting arrangement.

In an embodiment the downstream region comprises a downstream end region of the trough.

It will be appreciated that a spiral trough in accordance with the fourteenth aspect may be for use in a spiral separator in accordance with the second aspect.

According to a fifteenth aspect of the present disclosure there is provided a spiral trough for use in a spiral separator for providing at least partial separation of a first species and a second species, the spiral trough comprising:

a more upstream region, the more upstream region comprising a slurry feed region adapted, in use, to receive a feed slurry comprising a mix of said first species and said second species from a feed arrangement of said spiral separator;

a more downstream region, adapted to be provided in said spiral separator with a splitting arrangement provided at or immediately adjacent the more downstream region, to split a concentrated band of the first species from the rest of the flow in the spiral trough;

wherein the more upstream region of the spiral trough has a trough floor region, and provides an effective cross-trough floor slope relative to the horizontal, which reduces from between 15 and 20 degrees to a cross-trough floor angle of between 10 degrees and 14 degrees; and wherein the more downstream region of the spiral trough has a trough floor region having an effective cross-trough floor angle which reduces to between 4 degrees and 8 degrees, relative to the horizontal.

It will be appreciated that a spiral trough in accordance with the fifteenth aspect may be for use in a spiral separator in accordance with the third aspect.

According to a sixteenth aspect of the present disclosure there is provided a spiral trough for use in a spiral separator wherein the spiral trough is configured to provide a trough floor with an effective cross-trough floor slope which reduces between an upstream region thereof and a downstream region thereof, and wherein the reduction in effective cross-trough floor slope in a turn at a downstream region of the spiral trough is provided by the pitch of a more radially outer region of the spiral trough and the pitch of a more radially inner region of the trough being different over said turn of the spiral trough, and wherein the difference in pitch over said turn is between 0.08 and 0.18 times the radial distance between said more radially outer region and said more radially inner region.

In an embodiment the downstream region is adapted to receive or comprise a splitting arrangement of said spiral separator, and to provide said turn of the spiral trough in a turn immediately upstream of the splitting arrangement.

In an embodiment the downstream region comprises a downstream end region of the trough.

It will be appreciated that a spiral trough in accordance with the sixteenth aspect may be for use in a spiral separator in accordance with the fourth aspect.

According to a seventeenth aspect of the present disclosure there is provided a spiral trough for use in a spiral separator for separating a more-desired material from a less-desired mineral of a feed slurry containing said more-desired and less-desired materials, wherein the less-desired material has a specific gravity less than that of the more-desired material, and wherein the spiral trough comprises:

a more upstream region adapted, in use, to receive the slurry from a feed arrangement of said spiral separator;

a more downstream region;

wherein the feed arrangement is, in use, arranged to feed a feed slurry of the more-desired and less-desired materials into the more upstream region of the spiral trough;

wherein the more upstream region of the spiral trough has a trough floor region, and provides one or more effective cross-trough floor angles relative to the horizontal, to thereby provide a preliminary concentrate band in which some of the less-desired mineral is mixed with concentrated more-desired material;

wherein the more downstream region of the spiral trough has at least one floor region, having a cross-trough floor angle configured to provide a refiner region where a balance of centrifugal and gravitational forces on the preliminary concentrate band is such that both the more-desired and less-desired materials would, if the balance of forces were maintained, migrate outwardly;

wherein spiral trough provides a refinement part of the refiner region at which, in use, least some of the less-desired material has migrated outwardly from a radial position corresponding to that of the preliminary concentrate band, and at which no substantial amount of the more-desired material has migrated substantially outwardly due to the balance of centrifugal and gravitational forces, so that a refined concentrate band is provided at the refinement part.

In an embodiment the more downstream region is adapted to receive or comprise a splitting arrangement of said spiral separator, and to provide said refinement part immediately upstream of the splitting arrangement.

In an embodiment the refinement part is provided substantially at a downstream end part of said trough.

It will be appreciated that a spiral trough in accordance with the seventeenth aspect may be for use in a spiral separator in accordance with the fifth aspect.

will be appreciated that features or characteristics of any of the above aspects or embodiments thereof may be incorporated into any of the other aspects. Further, features and characteristics described in relation to any embodiment of a particular given aspect may be considered to be disclosed as being independently applicable to other aspects without requiring importation of other limitations of the said particular given aspect.

BRIEF DESCRIPTION OF THE DRAWINGS

Embodiments will be described below, in detail, with reference to accompanying drawings. The primary purpose of this detailed description is to instruct persons having an interest in the subject matter of the invention how to carry the invention into practical effect. However, it is to be clearly understood that the specific nature of this detailed description does not supersede the generality of the preceding broad description. In the accompanying diagrammatic drawings:

FIG. 1(*b*) is a schematic side elevation of the spiral separator of FIG. 1A, but showing only one of the three spirals;

DETAILED DESCRIPTION

Figure 1A:
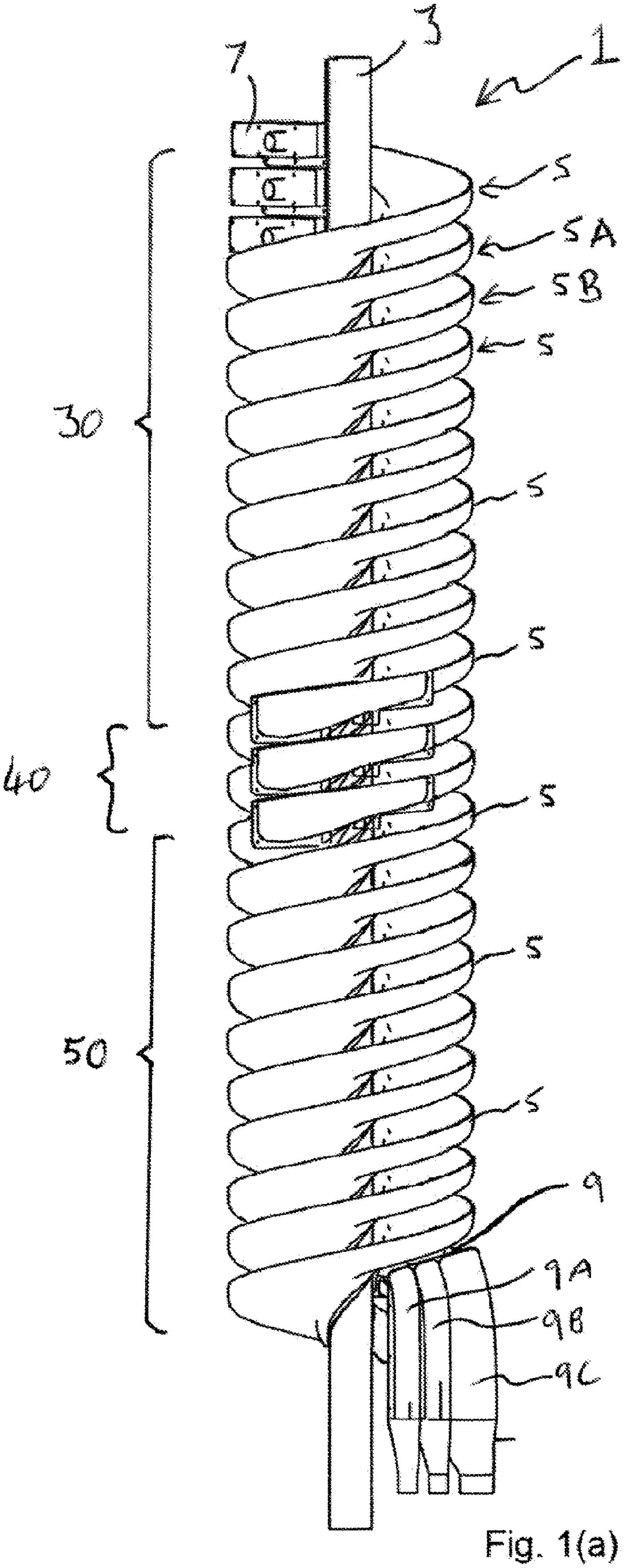
FIG. 1(*a*) is a schematic side elevational view of an embodiment of a spiral separator in accordance with the present disclosure, being a three start separator with three spirals.

With reference to the accompanying drawings, an embodiment of a spiral separator, generally designated by the reference numeral 1, will now be described. The spiral separator 1 is an embodiment for use in wet gravity separation of desired (or more-desired) higher-density material, which in a particular embodiment is a heavy mineral, from an undesired (or less-desired) material with a lower specific gravity, for example silica sand.

Figure 1B:
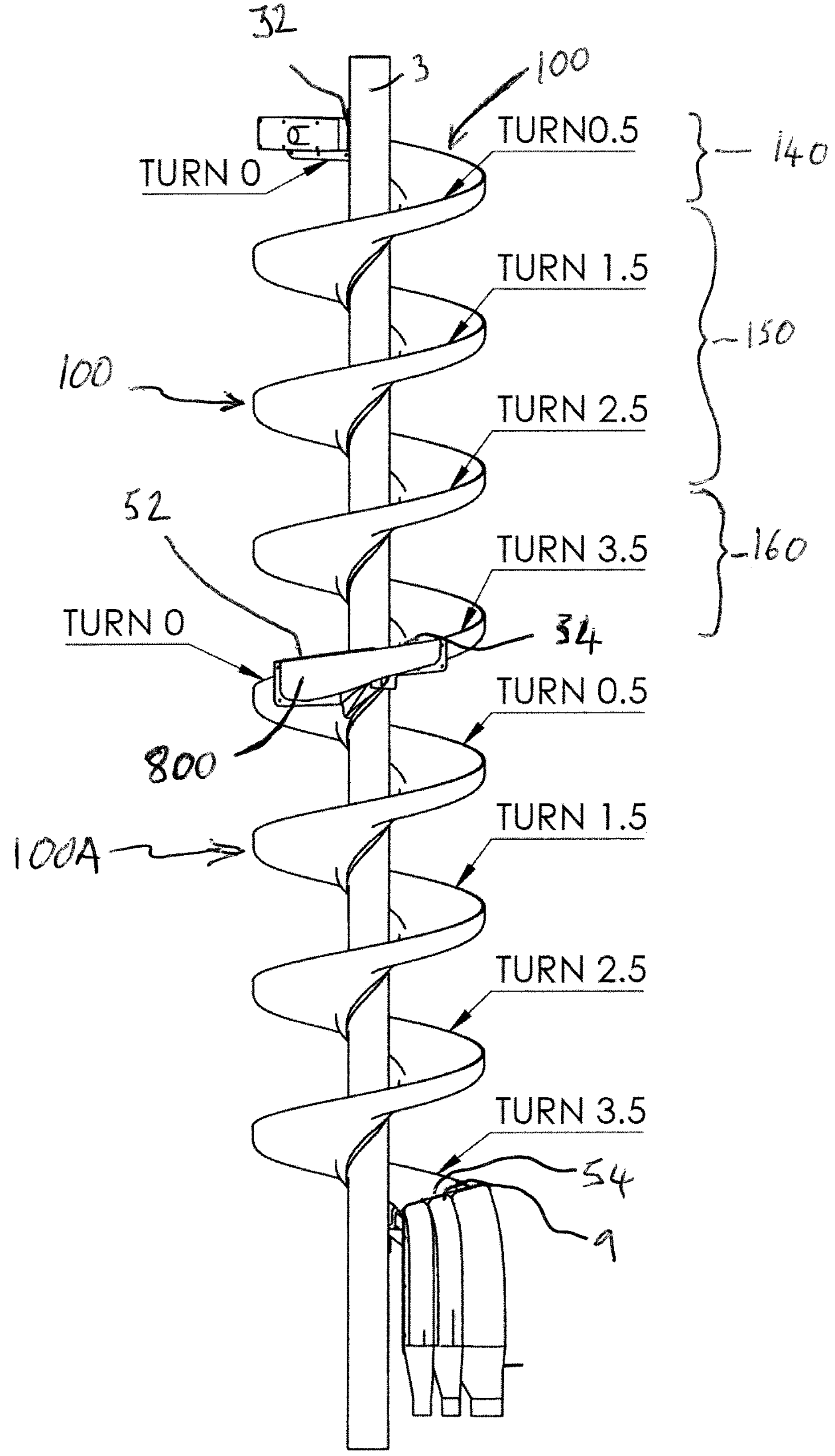

The spiral separator 1, as illustrated in FIG. 1(*a*), comprises an upright central column 3 supporting three spirals 5, 5A and 5B.

FIG. 1(*b*) shows for clarity, only a first of the three spirals, designated by the reference numeral 5. The second and third spirals 5A and 5B, shown in FIG. 1, are substantially identical to spiral 5. As will be appreciated by those skilled in the field of spiral separators for wet gravity separation, the spiral separator 1, having three spirals, may be regarded as a "three start" separator.

In the embodiment illustrated in FIG. 1(*a*), the second and third spirals 5A, 5B are arranged so that each respective turn of each of the second and third spirals is substantially below the corresponding turn of the first spiral 5. As the three spirals of the separator 1 are substantially identical, for simplicity and clarity only the first spiral 5 will be described in detail, and it should be appreciated that where only one spiral is explicitly described or illustrated, the other spirals correspond. However, it should also be appreciated that the present disclosure is not limited to a spiral separator having three spirals, but is also applicable to spiral separators having a single spiral, two spirals, or four or more spirals, that is, generally, to single-start and to multiple-start spiral separators.

A conventional arrangement (not shown), for example including a powered pump, is provided for admitting a slurry or pulp to each spiral via a feedbox, for example feedbox 7, at a predetermined rate, at or adjacent the top of the spiral. The feedbox 7 may be a conventional type of feedbox having stilling baffles (not shown) installed internally to slow and "still" the feed allowing low velocity entry of the slurry or pulp onto the first turn of the corresponding spiral. The terms slurry and pulp, as used herein, should be considered to be used interchangeably. Similarly the terms helix and spiral should be considered to be used interchangeably, unless context dictates otherwise A splitting arrangement 9, which may be a conventional splitting arrangement, is provided at the bottom of each spiral 5, 5A, 5B for splitting the descending slurry stream into fractions (for example corresponding to radially distributed streams or bands) and recovering certain desired fractions. In the illustrated embodiment the splitting arrangement 9 comprises splitters (not shown) and off-take channels 9A, 9B, 9C provided to split and off-take the descending slurry flow into a concentrates fraction, a middlings fraction and a tails fraction, respectively.

The spiral separator 1 may be regarded as a two-stage separator, comprising a first stage 30 and a second stage 50.

The first stage 30 comprises a first helical trough part of each spiral, for example a first helical trough 100 of the first spiral 5. The first helical trough 100 is 3.5 turns from a pulp feed point 32, where pulp is fed onto the first helical trough 100 by the feedbox 7 to a concentrate off-take point 34 provided at or adjacent the downstream end of the first helical trough 100, that is, substantially at the end of the first stage 30.

Directly downstream of the first stage 30 there is provided a mixing region 40 for remixing components of the slurry which exit the first stage 30, other than a concentrates stream which is removed at the take-off point 34. The second stage 50 is directly downstream of the mixing region 40, and comprises a second helical trough 100A which is 3.5 turns from a pulp feed point 52, where pulp exits the mixing region 40 and is fed onto the second helical trough 100A, to an off-take point 54 at the splitting arrangement 9. The first and second helical troughs 100, 100A of the first spiral 5 may be substantially identical, each providing a substantially similar trough shape and variation of floor angle over corresponding turns, as will be described in due course. If desired, further similar stages may be provided, with each stage being separated by a mixing region. The mixing region 40, in the illustrated embodiment, provides a slurry preparation apparatus, for example slurry preparation apparatus 800, which will be described in due course with reference to FIGS. 8 to 15, for preparing the slurry for entry onto the second stage 50. In the described embodiment the slurry preparation apparatus includes a concentrate take-off, at take-off point 34, but is will be appreciated that the concentrate take-off at take-off point 34 may, in a variation, be provided on, or as part of, the trough 100.

The shape of the first trough 100 will now be described in more detail, bearing in mind that the shape of the second trough 100A is substantially similar in the illustrated embodiment.

FIGS. 2, 3, 4, 5 and 6 are somewhat schematic radial cross sectional views at progressively lower, or more downstream, parts of the trough 100, illustrating the variation of the profile of the first trough 100, in the spiral separator 1 of FIG. 1, in successively downstream parts of the first trough 100. The particular embodiment illustrated by FIGS. 2 to 6 is provided by way of example only, and other embodiments and variations are of course possible.

It should be appreciated that reference to a radial cross section at a given point is intended to mean a cross section in a plane which includes that point, which extends in a radial direction of the trough, and which is parallel to and intersects the helix axis (which is also, in this embodiment, the axis of the central column 3). Reference to cross-trough floor slope or cross-trough floor angle is intended to mean the slope or angle of the floor of the trough when viewed in radial cross section.

Figure 2:
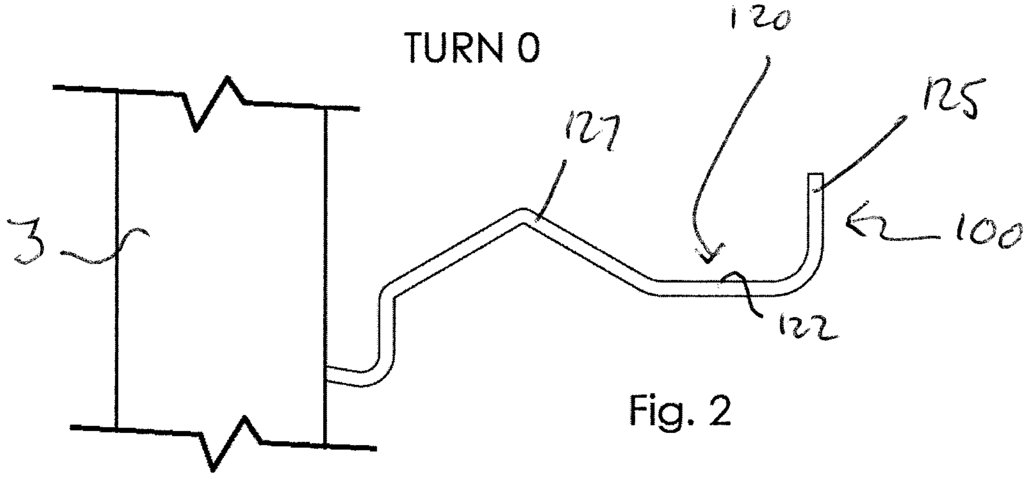
FIGS. 2 to 6 are schematic radial cross sectional views, to larger scale, of parts of the spiral shown in FIG. 1(*a*)

FIG. 2 illustrates the radial cross sectional shape, or profile, of the first trough 100, at an uppermost or most upstream part, that is, at or adjacent the slurry feed point 32. This position is marked as TURN 0 in FIG. 1(*b*), indicating that this position corresponds to approximately zero turns after the feed point. At this part the trough 100 has a floor profile providing a relatively narrow feed entry channel 120 allowing feed to enter the trough 100, from the feedbox 7, at a radially outer part of the trough 100. The feed entry channel 120 has a floor part 122 which is substantially horizontal in radial cross section. The feed entry channel 120 is bounded on the radially outer side of the channel 120 by an upstanding outer wall 125 of the trough 100, and bounded on the radially inner side of the channel 120 by a raised profile part 127 of the trough 100.

In the illustrated embodiment the trough profile changes with successive turns of the trough 100, as illustrated by FIGS. 2 to 6 when considered together.

Figure 3:
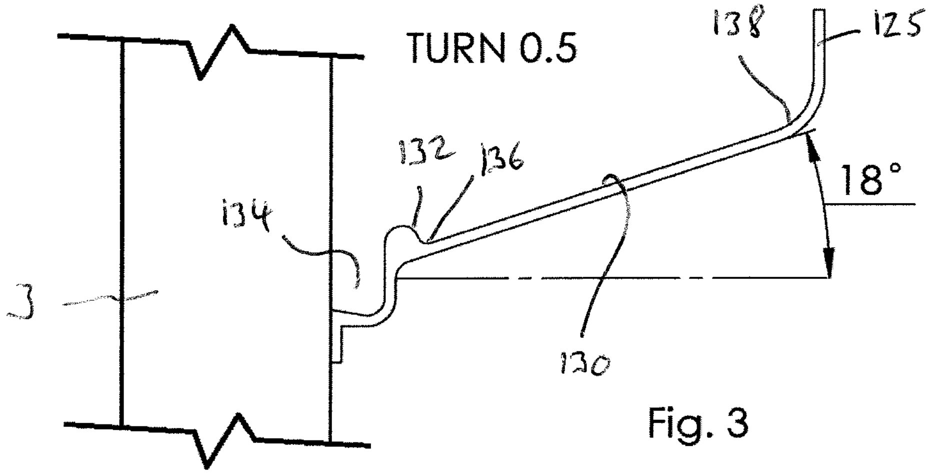

As can be seen by comparison of FIGS. 2 and 3, the raised profile part 127 is rapidly flattened, over the first half turn.

In the illustrated embodiment, from turn 0.5 down, the trough 100 provides a trough floor 130, with a profile which is substantially straight and which extends across most of the radius of the trough 100, as can be seen generally from FIGS. 3 to 6.

The trough floor 130 is provided between, and bounded by, the upstanding outer wall 125 of the trough 100 on the radially outer side of the trough floor 130, and an upstanding inner wall part 132 of the trough 100 on the radially inner side of the trough floor section 130.

In the illustrated embodiment the upstanding inner wall part 132 of the trough 100, provides a barrier between the trough floor 130, and a radially inner concentrate gutter 134, which may be used (particularly in second or subsequent stages of the spiral separator) to convey concentrate which has been separated from the rest of the slurry, quarantined away from the slurry which is still subject to the separation process in the spiral.

The trough floor 130, in the illustrated embodiment, may be regarded as the region which is substantially straight in profile and the profile of which extends outwardly and upwardly from a radially inner part 136, where the inner wall part 132 transitions into the trough floor 130, to a radially outer part 138, where the trough floor 130 transitions into the upstanding outer wall 125. It should, however, be appreciated that the trough floor 130 is not required to be straight in profile in all embodiments.

The trough floor 130 may be regarded as a working surface of the trough 100 on which separation occurs, and on which components of the slurry are desirably radially mobile to allow separation of different materials.

The variation in profile of the trough, and in particular the change in cross-trough angle of the trough floor, relative to horizontal, over successive turns will now be described in relation to the illustrated embodiment. The different angles of the trough floor are indicated by angles marked on FIGS. 3 to 6. It should be appreciated that the numerical values provided in the Figures for the trough floor angles and the positions indicated by number of helix turns from the feed point 32, are for a particular embodiment and by way of example only.

As illustrated in FIG. 3, at turn 0.5 the trough floor 130 may have a cross-trough floor slope angle of about 18 degrees (or, more broadly speaking, of between about 15 and about 20 degrees). The transition from the profile shown in FIG. 2 to the profile shown in FIG. 3 may be regarded as a feed transition zone, designated 140 in FIG. 1(*b*), within which the slurry increases in velocity in a steady and controlled manner.

In this feed transition zone, the cross sectional shape of the trough transitions gradually from providing relatively narrow feed entry channel 120, adjacent the outer wall 125 of the trough 100, having a floor part 122 with substantially zero cross-trough floor slope (at Turn 0, as illustrated in FIG. 2) to providing a substantially full width floor profile (at Turn 0.5, illustrated in FIG. 3) with a cross trough slope of between about 15 and about 20 degrees.

The increase in velocity of the slurry will of course be somewhat dependent on the slope of the trough floor 130 in the down-trough direction, in addition to the slope in the cross-trough direction, which is represented by the profile or cross sectional slope, as illustrated in FIGS. 2 to 6. As will be understood by those familiar with spiral separators for wet gravity separation, the slope in the down-trough direction varies across the width of the trough, as the radially outward part of a helical trough, being further from the helix axis, describes a much longer path over each turn than does the more inward part of the helical trough, while undergoing approximately the same vertical descent. The down-trough slope at any given radial point (ignoring cross-trough slope) is broadly speaking determined by the pitch of the spiral trough. The described embodiment has substantially similar pitch to that used in known and widely used spiral separators, utilising a pitch of 42 cm. In variations the pitch could be different, for example in the range of 35 to 50 cm for spirals of 60 to 65 cm diameter, although it will be appreciated that modified rates of change of cross-trough floor profile, compared to the examples provided, may be necessary or desirable in such variations. The described embodiment has substantially similar spiral width to that used in known and widely used spiral separators, for example a maximum distance from the spiral axis of about 32.5 cm.

In alternative embodiments the feed transition zone may be between about a quarter turn and about 1.5 turns, and the transition in the trough profile over this zone may be to a profile which provides a cross-trough floor angle of between about 15 and about 20 degrees. A cross-trough floor angle within this range may be regarded as a relatively shallow cross-trough floor angle for such an early (or upstream) part of a spiral separator for wet separation of heavy mineral from silica sand.

Figure 4:
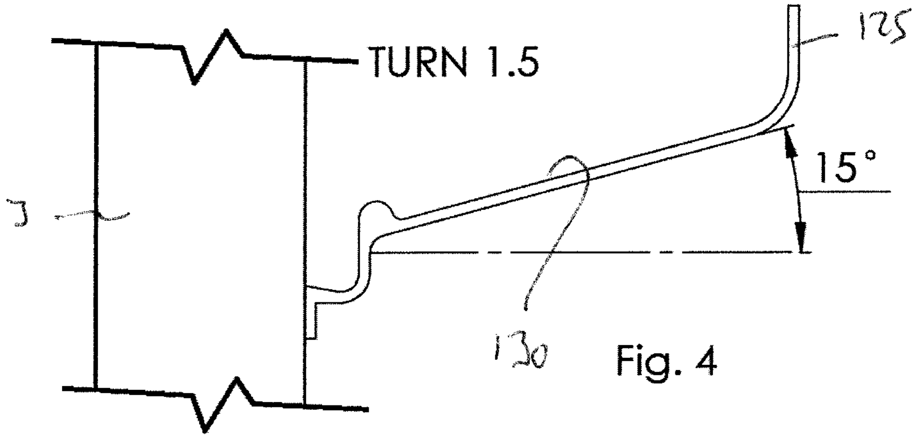

As illustrated by FIG. 4, in the illustrated embodiment the cross-trough floor angle is reduced by 3 degrees from about 18 degrees to about 15 degrees between turn 0.5 and turn 1.5. More generally, the trough profile transitions, immediately or soon after the feed transition zone 140, to provide the trough floor 130 with a cross-trough floor angle which is reduced by about 2 to 4 degrees over about a turn, to provide a cross-trough floor angle of about 14 to 16 degrees.

Figure 5:
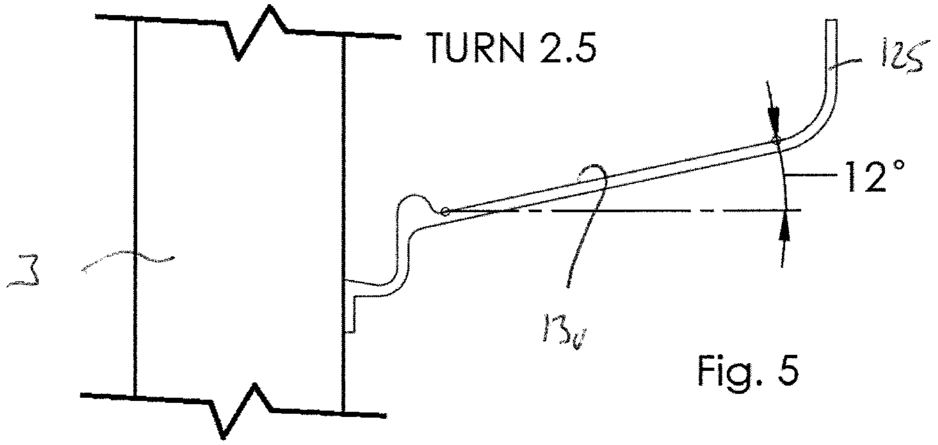

As illustrated by FIG. 5, in the illustrated embodiment the cross-trough floor angle is reduced by 3 degrees from about 15 degrees to about 12 degrees between turn 1.5 and turn 2.5. More generally, the trough profile may continue to transition, downstream of the feed transition zone, to provide the trough floor 130 with a cross floor trough angle which is reduced by about 2 to 4 degrees over about a turn, to provide a cross-trough floor angle of about or about 10 to 14 degrees.

These values described in the two paragraphs above may be considered to represent a gradual reduction of the cross-trough slope, for this part of the spiral, compared to most or all spiral separators commercially used, at least for wet gravity separation of heavy minerals from silica sand. The region over which this gradual reduction in cross-trough slope is provided, downstream of the feed transition zone, but not extending town as far as the concentrate off-take point 34, may be regarded as an intermediate region of the trough, schematically designated by the reference numeral 150 in FIG. 1(*b*). In the illustrated embodiment this region extends approximately two turns of the spiral trough, but it will be appreciated that in variations it may extend fewer than or more than two turns. However, it is considered desirable that the trough extends between about two turns and about five turns between feed point 32 and a concentrate off-take point 34.

Figure 6:
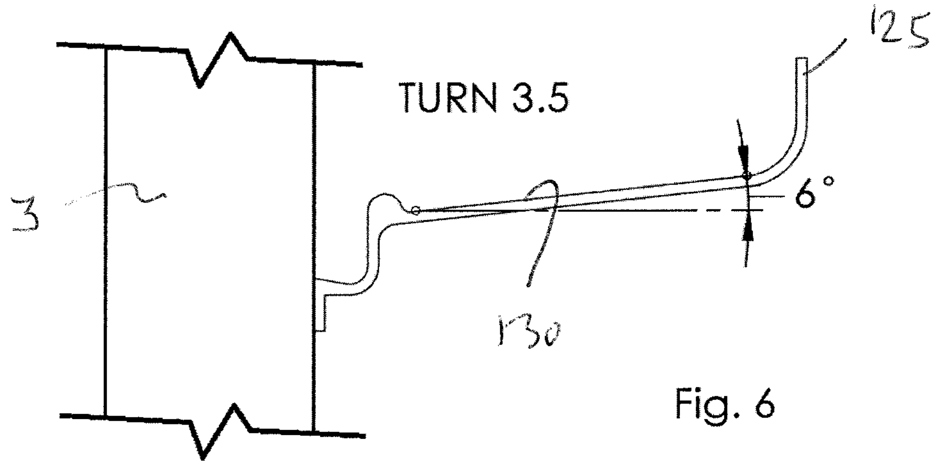

As illustrated by FIG. 6, in the illustrated embodiment the trough profile transitions in the final turn before a concentrate split is taken off, at an increased rate of reduction of the cross-trough floor angle, of about 6 degrees per turn, to provide a cross-trough floor angle of about 6 degrees in the final turn before a concentrate split is taken off, at concentrate off-take point 34, which in the illustrated embodiment is at about turn 3.5. More generally, in accordance with the present disclosure, the trough profile transitions in the final turn before a concentrate split is taken off, at an increased rate of reduction of the cross-trough floor angle of about 5 to 8 degrees, to provide a trough floor 130 with a cross-trough floor angle of about 4 to 8 degrees in the final turn before a concentrate split is taken off.

This may be regarded as a rapid change in the rate of reduction of floor angle just upstream of the concentrate split, and also a reduction to a very small or shallow cross-trough floor angle.

This progression of profile changes has been found to provide a trough which provides good separation efficiency compared to at least some known trough configurations.

Without wishing to be bound by theory, the mechanisms by which the good separation efficiency are believed to be achieved will be outlined below.

Before the turn of the trough immediately upstream of the concentrate off-take, the slurry has undergone a substantial amount of separation to provide a concentrate stream at a radially inner part of the trough, a middlings stream at a radially more outer region of the trough and a tailings stream at and adjacent the most radially outer region of the trough.

The concentrate stream contains a substantially higher concentration of the desired higher-density material from the slurry, for example a heavy mineral, than the initially fed slurry, but also contains some of the lower density, undesired material, for example silica sand, which it is desirable to remove from the concentrate stream before splitting the concentrate band from the rest of the slurry flow.

The rapid change in the rate of reduction of floor angle just upstream of the concentrate split, and also the very small or shallow cross-trough floor angle in this region, result in a region just upstream of the concentrate split in which the balance of gravitational and centrifugal forces is different to that in the more upstream parts to the spiral trough. That is, the gravitational force on the slurry in the inwardly radial direction is reduced due to the reduced cross-trough slope. This results in a tendency for the slurry components to move outwardly. The lower-density, less-desired, material in the concentrate stream is more mobile than the higher-density, more-desired material, at least in part because the higher-density, more-desired material experiences greater drag on the trough floor. Water in the concentrate stream, is even more mobile than the lower-density material.

A substantial amount of lower-density material (and water) in the concentrate stream therefore migrates outwardly before a substantial amount of the higher-density material migrates outwardly. This may be regarded as providing a "tipping" or "panning" effect, somewhat related to separation using a gold pan in a swirling manner with variable tilt to the pan to wash or tip off lower density material from higher density material.

Thus the concentrate stream entering the region immediately upstream of the concentrate off-take may be regarded as a preliminary concentrate stream. The region immediately upstream of the concentrate off-take may be regarded as a refiner region, schematically designated 160 in FIG. 1(*b*), which refines the preliminary concentrate stream by causing outward migration of a substantial amount of the lower-density material from the preliminary concentrate stream, to leave a refined concentrate stream with a greater concentration of higher-density material than is present in the preliminary concentrate stream. The refiner region may therefore be regarded as having a refinement part at which the preliminary concentrate stream has substantially become a refined concentrate stream.

The concentrate off-take is positioned to split off the refined concentrate stream from the rest of the flow before a substantial amount of the higher-density material migrates outwardly out of the refined concentrate stream.

Use of a trough which provides a relatively shallow cross-trough floor angle at an early (or upstream) part of a the spiral trough, and which then decreases in cross-trough floor angle relatively slowly is believed to assist in preventing or reducing uncontrolled and un-damped water flow down the spiral which can occur due to low slurry viscosity at and near the slurry feed in point. Such uncontrolled and un-damped water flow is believed to be characteristic of steep cross-trough profiles.

The relatively low initial cross-trough slope is thus believed to assist in allowing the slurry fed into the trough to settle into a steady and low turbulence regime conducive to good separation.

Once the flow pattern on the trough surface starts to develop, water begins to move outward under the influence of centrifugal force and low surface drag and the higher-density material, being constrained by high surface drag, inward, so that the concentrate stream, middlings stream and tailings stream (referred to above) develop.

The developing concentrate and middlings slurry streams on the radially central and inner parts of the trough, have far greater viscosity than the slurry immediately exiting the feedbox 7. This is believed to damp the flow of slurry so that a gradual reduction in the cross-trough floor slope (of about 2 to 4 degrees per turn) in the part of the trough between the feed transition zone and the refiner region is sufficient to allow effective separation. This is in contrast to the rapid reduction in cross-trough floor slope (of about 6 degrees over one turn, from 21 deg to 15) at this part of the trough taught by Wright, and widely used in commercial wet gravity spiral separators.

This relatively gradual reduction in cross-trough floor slope in the intermediate part of the trough is believed to be conducive to maintaining more water in the pulp at all downstream points once the flow settles, allowing good mobility and freedom for the more dense material to move along the bottom of the slurry and migrate inwards to form, or join, a concentrate stream.

The relatively high level of water in the radially central and inner parts of the trough is believed to assist the refinement of the concentrate in the refiner region, as water migrating outwardly from the preliminary concentrate stream will tend to carry with it lower density material, thereby facilitating or improving the refinement.

Thus, the configuration of the trough of preferred embodiments in the regions upstream of the refiner region is considered to assist the refinement of the preliminary concentrate band in the refiner region.

It will be appreciated that in the illustrated embodiment the profile of the trough floor, that is, the shape of the trough floor when viewed in radial cross section of the spiral, in a plane which includes the spiral or helix axis, describes an inclined, substantially straight line. The angle of this line to the horizontal equates to the cross-trough floor slope in a straightforward manner.

However other trough floor shapes are possible, and with such other trough floor shapes the trough floor slope is less straightforward to define. For example, U.S. Pat. No. 4,476,980 describes a trough of a spiral separator in which the floor profile comprises a radially inner region with a straight profile of smaller slope which meets a radially outer region of greater slope, at a point referred to as the "point of maximum displacement". The slope of each region remains uniform over successive turns of the trough, but the overall slope of the trough floor between its most radially inner and outer parts is varied over successive turns by changing the position of the point of maximum displacement. That is, near the top of the trough the point of maximum displacement is positioned more radially inwardly, so the radially inner region is small and the radially outer region is large, so that the overall slope of the trough floor is closer to that of the radially outer region (ie relatively great). Nearer the bottom of the trough, the point of maximum displacement is positioned more radially outwardly, so the radially inner region is large and the radially outer region is small, so that the overall slope of the trough floor is closer to that of the radially inner region (ie relatively small). In other spiral separators the trough floor profile is convex, between a radially inner trough wall and a radially outer trough wall.

In troughs which have a non-straight trough floor profile, and therefore might not be regarded as having a single well defined cross-trough floor slope, the overall slope of the working surface of the trough floor, on which separation occurs, may be regarded as the effective cross-trough floor slope. For clarity, in order that statements regarding cross-trough floor slope may be applicable to troughs with floors that do not have a straight profile, the terms "effective cross-trough floor slope" and "effective cross-trough floor angle" are used herein to mean the overall angle or slope of the working surface of a trough floor a given point, as viewed in cross section in a plane which includes that point and which is parallel to and intersects the helix axis. The overall working surface is typically a surface extending between a transition between the trough floor and a radially inner wall of the trough, and a transition point between the trough floor and a radially outer wall of the trough.

Figure 7:
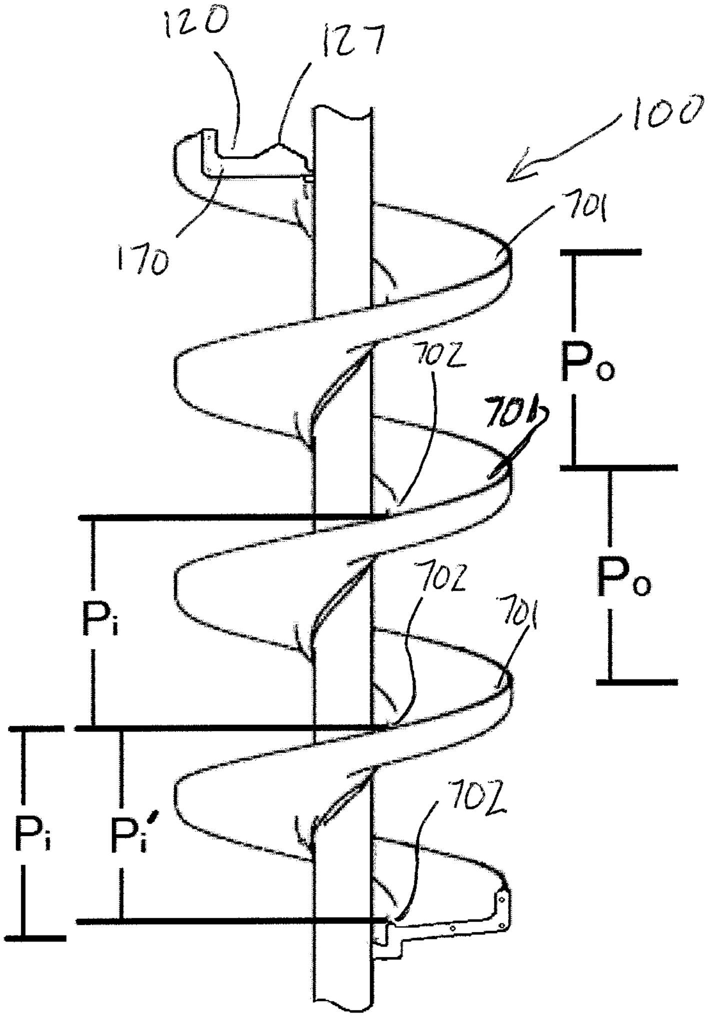
FIG. 7 is a schematic side elevation of a modular spiral trough used in the embodiment of FIGS. 1(*a*) and 1(*b*)
Figure 8:
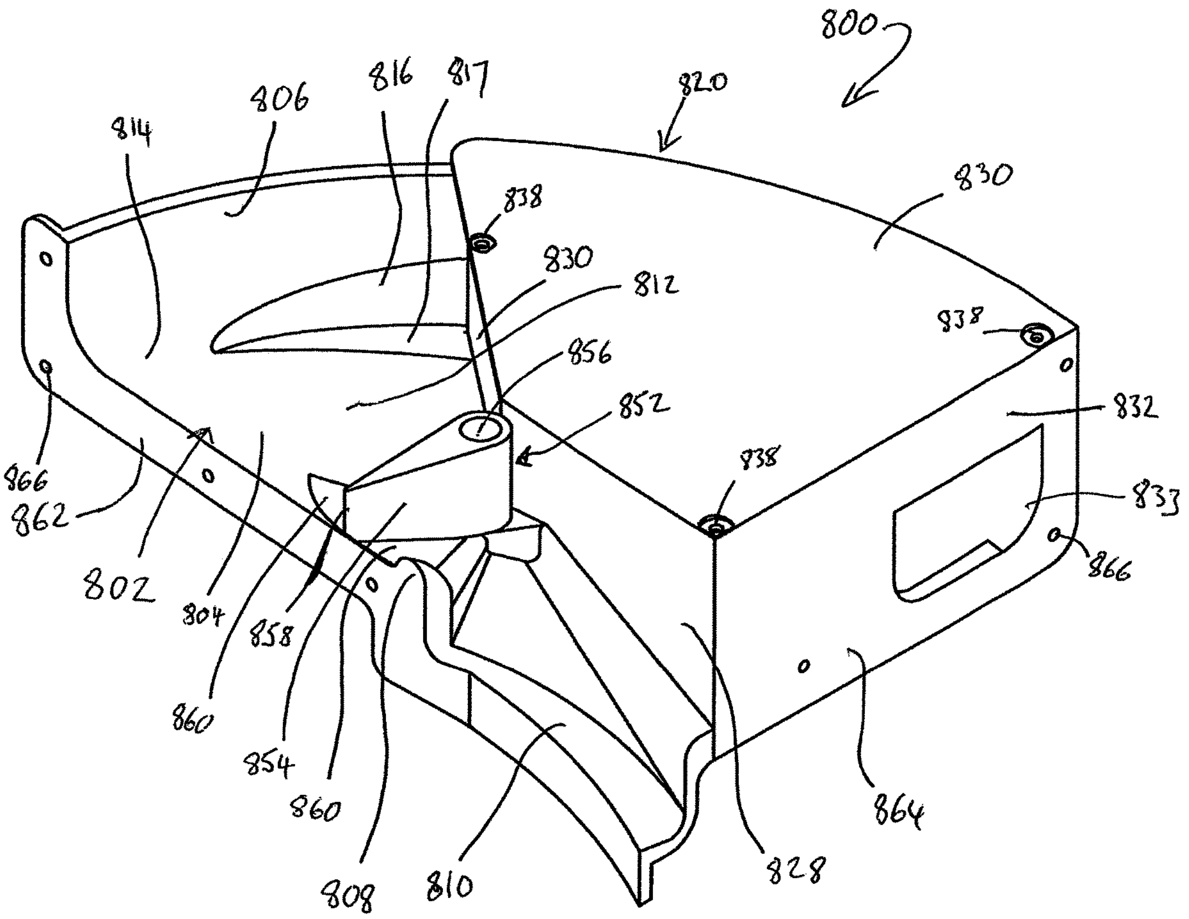
FIG. 8 is a schematic perspective view of a first embodiment of a slurry preparation apparatus in accordance with the present disclosure.
Figure 9:
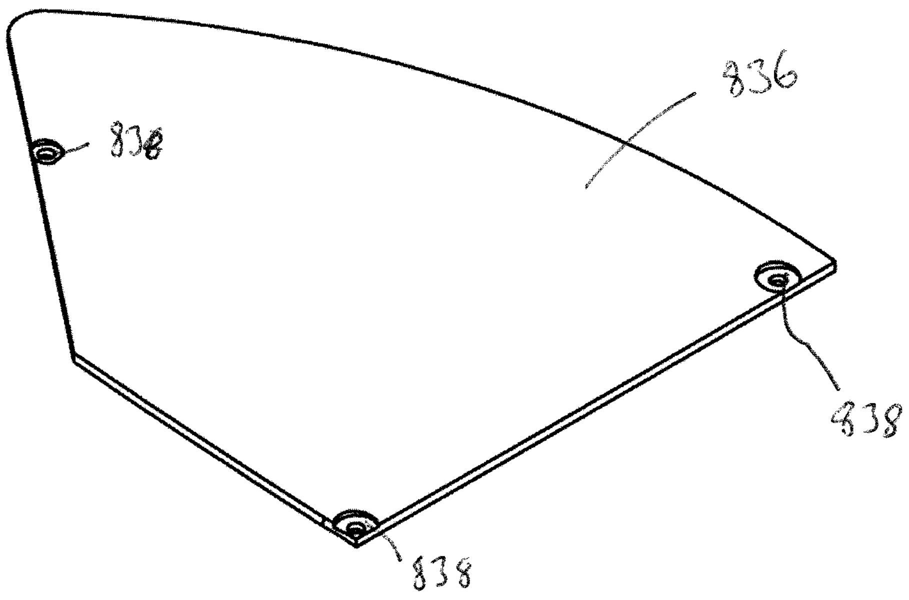
FIG. 9 is a schematic perspective view of a lid part of the embodiment of FIG. 8.

FIG. 7 illustrates a trough corresponding to the trough 100 (or the trough 100A) in isolation. It will be appreciated that in this embodiment the trough 100 is provided as a unit manufactured separately from the feedbox 7, slurry preparation apparatus 800, and (substantially identical) trough 100A, although in a variation the troughs 100, 100A and at least a floor part of the slurry preparation apparatus 800 may be manufactured as a single integral unit.

As shown in FIG. 7, the upper end of the trough 100 is provided with an upstream-end flange part 170 for attachment to the feedbox 7, with an upper part of the upstream-end flange part 170 having a profile reflecting the trough profile at the top of the trough (turn 0), as illustrated in FIG. 2, such as the channel 120 and raised profile part 127. The corresponding part (not shown) of the trough 100A provides these parts for attachment to the slurry preparation apparatus 800.

A lower end of the of the trough 100 is provided with a downstream-end flange part 180 for attachment to the slurry preparation apparatus 800, with an upper part of the downstream-end flange part 170 having a profile reflecting the trough profile at the bottom of the trough (turn 3.5), as illustrated in FIG. 6. The corresponding part of the trough 100A (or, more broadly, the trough used in the final stage of a multistage separator) provides these parts for attachment to the splitting arrangement 9 at the end of the second or final stage.

Changes in cross-trough slope (or effective cross-trough slope) are related to differences in pitch between inner and outer parts of the trough, and in particular between an outer region of the trough floor and an inner region of the trough floor. As illustrated somewhat schematically in FIG. 7, the pitch of an outer region of the trough floor, designated 701, is constant, with a pitch PO. The pitch of an inner region of the trough floor designated 702 varies, having a pitch Pi in a penultimate turn of the trough, and a pitch Pi' in the final turn of the trough. The pitch Pi of the inner region 702 in the penultimate turn of the trough is slightly smaller than the pitch PO of the outer region 701, corresponding to a relatively small or gradual reduction in cross-trough floor slope over the penultimate turn. The pitch Pi' of the inner region 702 in the final turn of the trough is substantially smaller than the pitch PO of the outer region 701, corresponding to a relatively large reduction in cross-trough floor slope over the final turn.

In embodiments in accordance with the present disclosure the refinement region may be provided by a difference in pitch between the pitch Pi' (of the inner region in the final turn) and the pitch PO of the outer region over the final turn being between 0.08 and 0.18 times the radial distance between the inner region 701 and the outer region 702. The difference in pitch may be between 0.9 and 0.14 times the radial distance between the inner region 701 and the outer region 702. The difference in pitch may be between 0.95 and 0.12 times the radial distance between the inner region 701 and the outer region 702.

The smaller reductions in slope in the intermediate region 150 may be provided by smaller differences in pitch.

As stated above, the separator 1 is a two stage spiral separator, and variations may provide additional stages.

In the separator 1 the first and second stages 30, 50 of the first spiral 5 are connected in line as a continuous spiral 5 via a slurry preparation apparatus 800, which prepares the slurry exiting the first stage 30 (other than the taken-off concentrate) for entry to the second stage 50. The slurry preparation apparatus 800 may also be regarded as being part of the continuous spiral 5. If additional stages are provided then, in an embodiment, the splitting arrangement 9 at the downstream end of the second stage 50, may be replaced by a further slurry preparation apparatus 800, and a third trough may be coupled to that further slurry preparation apparatus. If desired, one or more subsequent further slurry preparation apparatuses and troughs may be provided to provide one or subsequent stages.

Providing a mechanism in the part of the spiral between the first and second stages to prepare the slurry for entry to the second stage can greatly enhance separation in the second stage. In the first stage it is normal for the slurry flow to develop a high velocity water component flowing in the radially outer part of the trough which contains very low solids content and, in parallel, a high solids slurry flow spread out over the trough floor which has been dewatered due to centrifugal forces over a number of turns, and which has a solids content of around 60% to 80% by weight. Separation in the high solids slurry flow is poor due to the low mobility of heavy materials in this high solids flow, and the high solids flow tends to travel down the spiral trough without substantial radial movement of the solids, preventing efficient separation. It is therefore desirable to rewater the high solids slurry flow leaving the first stage before entry of the slurry to the second stage, in order to allow effective separation in the second stage. One function of the slurry preparation apparatus 800 is to mix water from the high velocity water component flowing in the radially outer part of the trough 100 with the high solids slurry flow flowing along the floor 130 of the first trough 100.

It has also been observed that if the slurry flow onto the second stage has substantially the same kinetic energy and momentum as it has when exiting the first stage, an undesirably high level of turbulence may occur in the trough of the second stage, which may not be conducive to rapid or effective settling of finer minerals or efficient separation in the second stage. Accordingly, it may be desirable to remove kinetic energy from, and dissipate the downstream momentum of, the slurry before entry to the second stage. A function of the slurry preparation apparatus 800 is to remove kinetic energy from the slurry prior to introduction of the prepared mixed slurry to the second stage.

It should be appreciated that the removal of kinetic energy and downstream momentum from the slurry flow exiting the first stage has been found to be problematic, especially for slurries with overall solids content of about or above 40% by weight, which is considered conducive to good separation efficiency for heavy minerals separation. In particular, removal of energy and momentum from the dewatered high solids slurry flow can cause the high solids slurry flow to stall altogether, causing sanding of the trough and effectively stopping operation of the spiral separator until the stalled solids are removed, for example by being hosed down the second stage trough. Of course it will be appreciated that hosing a portion of the slurry into the second stage trough will tend to create, at least for that portion of the slurry, a high level of turbulence which is not conducive to efficient separation.

In the embodiment of FIGS. 8 to 15, the slurry preparation apparatus 800 acts to remove kinetic energy and downstream momentum from the high velocity water stream prior to re-introducing the water of the high velocity water stream into the high solids slurry flow. Up until the water is reintroduced, the high solids slurry flow is substantially uninterrupted, and continues to flow substantially as it was flowing at the end of the first stage. The water from the high velocity water stream is re-introduced into the high solids slurry flow by allowing the water to drop onto, and into, the dewatered high solids slurry flow, so that mixing occurs despite the water having little or no momentum in the forwards or downstream direction of the spiral. The well mixed slurry, which has much lower viscosity than the dewatered high solids slurry flow, is then fed onto the second stage, into feed entry channel 120, adjacent to the outside wall 125, of the second stage trough 100A, in a low velocity condition and manner similar to new feed exiting the feedbox 7 on the uppermost stage.

With reference to FIGS. 8 to 15 an embodiment of a slurry preparation apparatus 800, will now be described in more specific detail.

The slurry preparation apparatus 800 provides a slurry entry region 802 at an upstream part thereof for entry of slurry exiting the trough 100 of the first stage 30. The slurry entry region 802 provides a trough floor part 804 configured to be continuous with the trough floor 130 of the first trough 100 at the most downstream end of the first trough 100, so that slurry can flow substantially unimpeded from the first trough 100 onto the slurry preparation apparatus 800. The slurry preparation apparatus 800 provides an upstanding radially outer wall 806, which in use is generally continuous with the upstanding outer wall 125 of the trough 100, and an upstanding inner wall part 808, which in use is generally continuous with the upstanding inner wall part 132 of the trough 100, and provides a radially inner concentrate gutter 810 which in use is generally continuous with the radially inner concentrate gutter 134 of the trough 100. It will be appreciated that in the illustrated embodiment a radially inner wall of the concentrate gutter 810 will be provided by the central column 3.

A radially intermediate region 812 of the trough floor 804, which is inclined downwardly in the downstream direction receives a high solid content, or middlings, part of the slurry flow from the first stage 30.

A radially outer region 814 of the trough floor 804 receives the high velocity water stream from the first stage 30. It will be appreciated that the high velocity water stream will also extend some way up the radially outer wall 806. The radially outer region 814 of the trough floor 804 transitions into a guide or ramp arrangement 816, which in use directs the high velocity water stream into an upper compartment 818 of a box-like arrangement 820 via an upper opening 822.

The radially intermediate region 812 of the trough floor 804 conveys the high solid content part of the slurry flow from the first stage 30 in the downstream direction into a lower compartment 824 of the box-like arrangement 820, configuration via a lower opening 826.

The box-like arrangement 820 has a radially outer wall, provided by the radially outer wall 806, and a radially inner wall 828. The box-like arrangement 820 further comprises an upstream end wall 830 and a downstream end wall 832. A lower edge 834 of the upstream end wall 832 is vertically spaced apart from the intermediate region 812 of the trough floor part 804, to thereby provide the lower opening 826 therebetween. The downstream end wall provides a lower, radially outer, outlet opening 833 for egress of prepared mixed slurry onto a downstream spiral trough.

The box-like arrangement 820 further comprises a lower floor, provided by the trough floor part 804 and an upper cover 836. In the illustrated embodiment the upper cover 836 is in the form of a removable close-fitting lid, which is provided with fixing apertures 838, which in use align with complementary fixing apertures 840, provided in the upstream end wall 830 and downstream end wall 832, to allow the lid to be securely attached using fixings such as screws (not shown).

The box-like arrangement 820 further comprises an intermediate floor part 842, which separates the upper compartment 818 and lower compartment 824. The intermediate floor part 842 provides an opening 844 through which the high water content part of the slurry flow drops onto, and into the high solids content slurry which is progressing through the lower compartment 824, beneath the opening 844.

The upper compartment 818 provides a dividing wall 846 to define a convoluted, serpentine passageway 848 through the upper compartment 818, for passage of the high water content part of the slurry flow. In the illustrated embodiment the dividing wall 846 provides a first dividing wall part

846A substantially parallel to and spaced apart from the radially outer wall 806, a second dividing wall part 846B substantially parallel to and spaced apart from the downstream end wall 832, and a short return dividing wall part 846C directed away from the second dividing wall part 846B in the upstream direction. The passageway 848 is thus configured to provide a first passageway part 848A between the first dividing wall part 846A and the radially outer wall 806, a second passageway part 848B between the second dividing wall part 846B and the downstream end wall 832, and a third passageway part 848C directed substantially upstream parallel to the radially inner wall 828, with pronounced directional changes between the passageway parts.

It will be appreciated that the high water content part of the slurry flow must flow through the passageway 846, before it reaches the opening 844. The flow through the passageway 846, with substantial directional changes and at least one reversal in direction, substantially reduces the kinetic energy and downstream momentum of the high water content part of the slurry flow, due to the baffle effect of impacts with the walls of the passageway and the creation of turbulence in the water. The high water content part of the slurry flow may impact and be further baffled by impacts with further wall parts, such as the downstream-side surface of the upstream end wall 830, the radially inner surface of the first dividing wall part 846A, and the upstream-side surface of the second dividing wall part 846B, as can be seen, for example in FIG. 10, in which the route of the high water content part of the slurry flow is schematically illustrated by broken-line arrow 850. Thus by the time the water from the high water content part of the slurry flow falls through the opening 844, its kinetic energy and downstream momentum have been effectively dissipated.

The falling of the water onto the high solids content slurry below provides effective mixing without imparting substantial downstream velocity to the slurry as a whole. This provides a mixed, low velocity, low viscosity slurry, which is then directed by a suitable guide arrangement in the lower compartment to the outlet opening 833, to provide a slurry feed onto a second (or subsequent) stage and spiral trough. It is desired that the prepared mixed slurry flows into the second or subsequent stage in much the same well mixed and low velocity condition as the slurry exiting the feedbox 7 onto the first stage.

It is believed that the illustrated embodiment facilitates the low energy water percolating down through opening 844 in a low velocity spiral, which enhances mixing with the high solid content slurry in the lower compartment.

The upper compartment 818 of the box-like arrangement 820 may be regarded as an example of an energy dissipation region, and the box-like arrangement 820 may be regarded as an example of an energy-dissipation box. The vicinity of the opening 844, may be regarded as an example of a drop region, which provides a vertically downward acceleration of material (water) from a more fluid stream to facilitate mixing of the water with a less fluid stream, which in this example is the high solid content middling stream from the first stage. The walls of the passageway 848 may be regarded as baffles, which at least contribute to dissipation of the kinetic energy of the more fluid, high water content part of the slurry.

It will be appreciated that the configuration of the ramp and passage, to provide a floor part which diverges upwardly relative to the trough floor, and therefore allows the high water content component to be elevated relative to the high solid content slurry flow is, at least in this embodiment, important to thereby provide the drop region It should be appreciated that in the illustrated embodiment the area under the guide or ramp arrangement 816 is solid material or blocked off by a blocking wall 817 to prevent water from the high solid content flow migrating outwardly into this area, as such further dewatering of the already dewatered high solid content flow could further increase its viscosity sufficiently to undesirably impede flow, for example causing sanding as discussed above.

It should be appreciated that the preparation of slurry for feeding onto a second or subsequent stage occurs after (or downstream of where) a concentrate stream has been split from the rest of the slurry. Thus a concentrate off-take is provided upstream of, or at an upstream part of, the slurry preparation apparatus 800.

In the illustrated embodiment the slurry preparation apparatus 800 provides a concentrate splitter 852, at an upstream part thereof and adjacent to the inner concentrate gutter 810, to take a concentrate split (which may be of the refined concentrate stream, discussed above) from the slurry flow, directing it into the concentrate gutter 810. In the illustrated embodiment the concentrate splitter 852, comprises a splitter vane 854 which can be pivoted about a vane support 856 such as a suitable post, in order to vary the size of the off-take opening. The splitter vane 854 has a sharp vertically orientated leading edge 858 to facilitate taking a clean split. The splitter vane 854 is set down in a slightly recessed region 860 of the trough floor part 804 as a slight drop in the slurry as it contacts the leading edge 858 of the splitter vane 854 has been found advantageous. (It should be appreciated that the splitter vane 854 and vane support 856 are omitted from FIGS. 12, 14 and 15.)

As foreshadowed above, in a variation, at least a floor part of the slurry preparation apparatus 800 may be manufactured as a single integral unit with at least one of the upstream and downstream spiral troughs. However, in the illustrated embodiment the slurry preparation apparatus 800 and each of the upstream and downstream spiral troughs 100, 100A is manufactured as a separate modular unit.

The slurry preparation apparatus 800 therefore provides arrangements for facilitating connection to the upstream and downstream spiral troughs 100, 100A. The slurry preparation apparatus 800 provides upstream and downstream flanges, with the upstream flange 862 adapted to allow coupling to a downstream flange (not shown) of a trough located upstream of the slurry preparation apparatus 800, and the downstream flange 864 adapted to allow coupling to an upstream flange of a trough located downstream of the slurry preparation apparatus 800. The flanges 862, 864 may be provided with fixing holes 866 to facilitate connection using fasteners such as screws or bolts. In the illustrated embodiment, the configuration of the downstream flange 864, as well as the positioning of the outlet opening 833, to the functionally similar parts of the feedbox 7, so that the configuration of flange plate 170 suitable for attachment to the feedbox 7 is also suitable for attachment to the downstream flange 864 of the slurry preparation apparatus 800.

Figure 10:
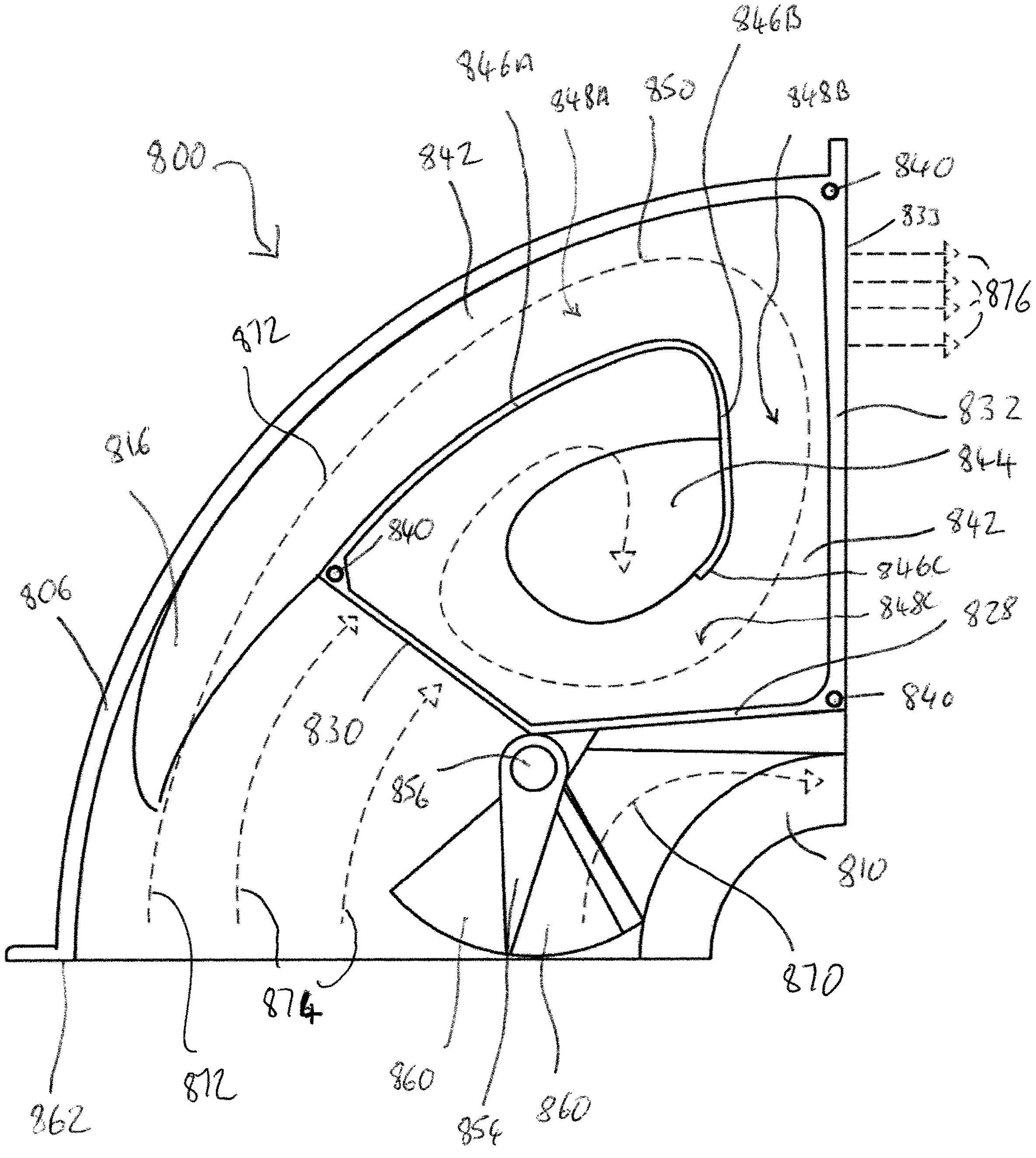
FIG. 10 is a top plan view of the embodiment of FIG. 8, in use, with the lid omitted so that internal detail is visible.
Figure 11:
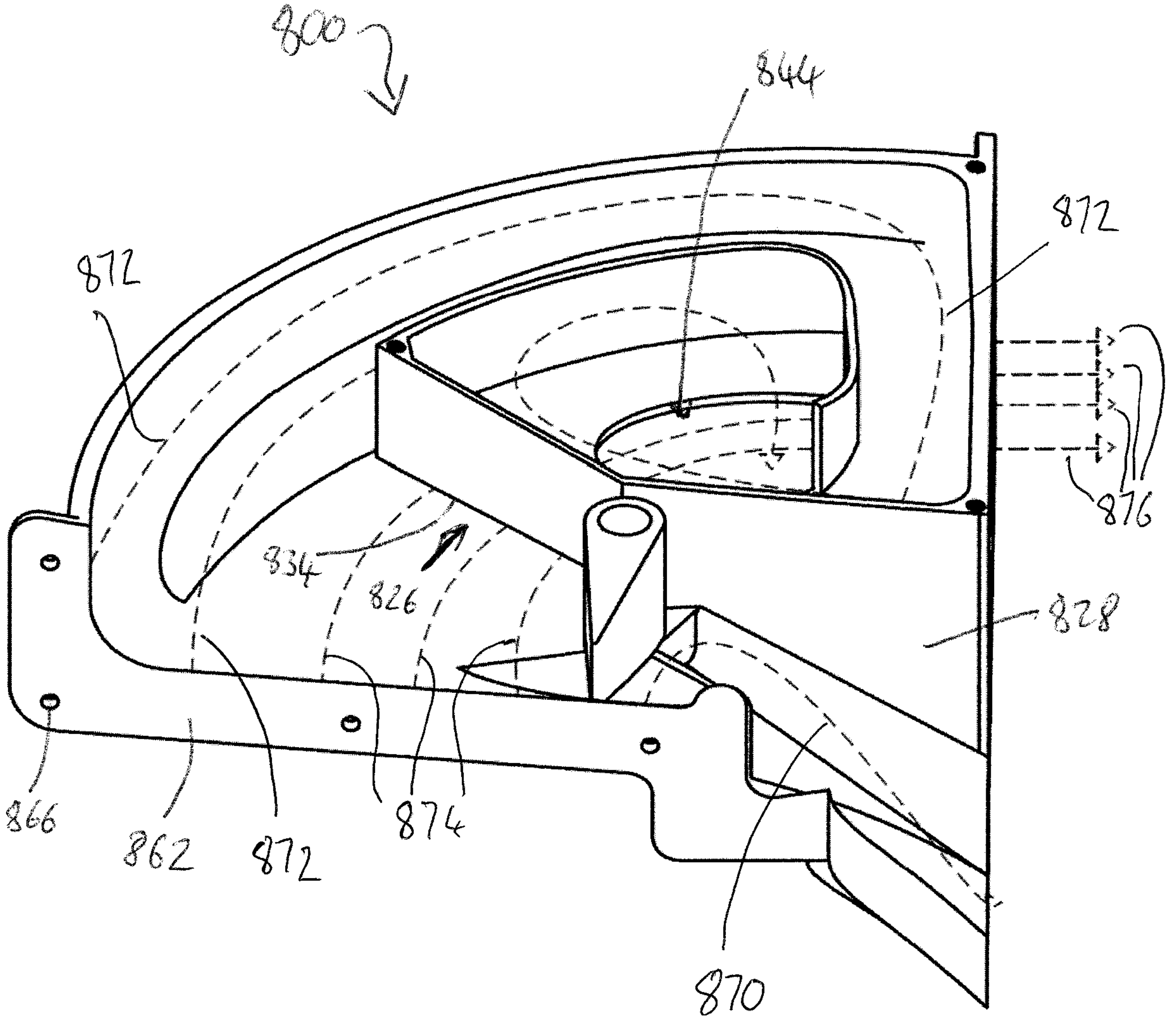
FIG. 11 is a perspective view of the embodiment of FIG. 8, in use, with the lid omitted so that internal detail is visible.
Figure 12:
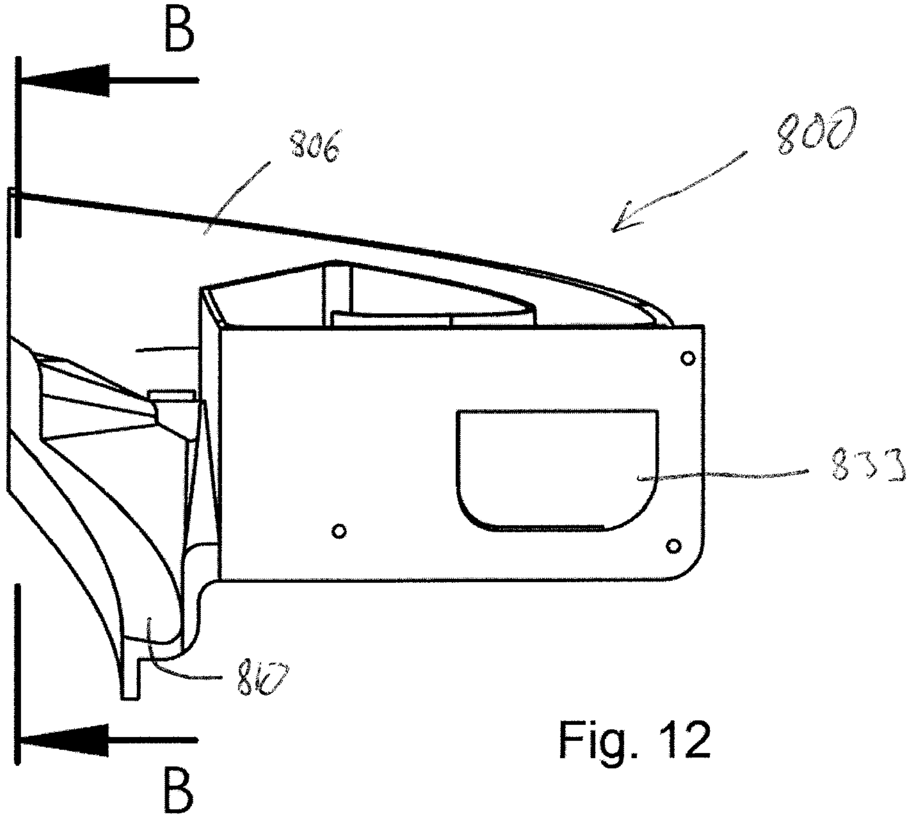
FIG. 12 is a further perspective view of the embodiment of FIG. 8, with the lid omitted.
Figure 13:
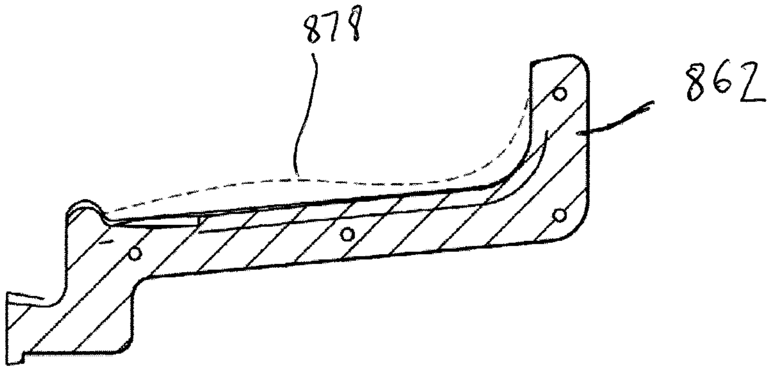
FIG. 13 is a cross sectional view on B-B of FIG. 12.
Figure 14:
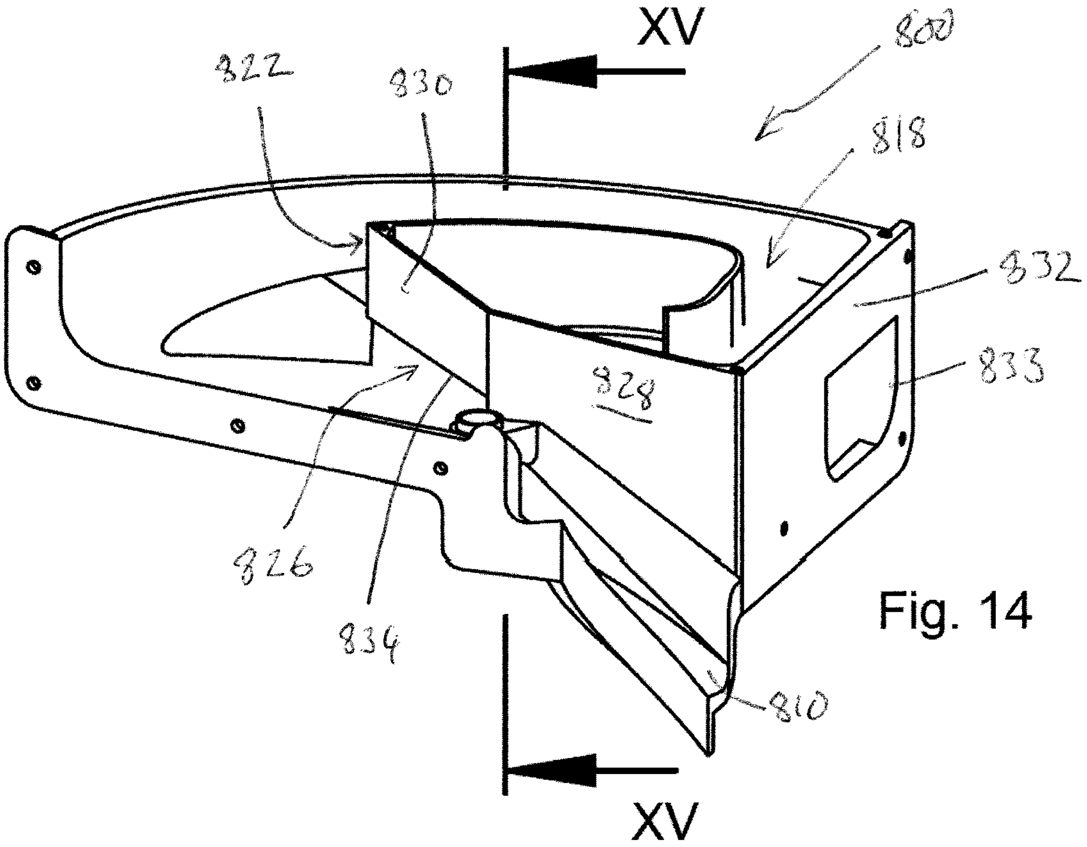
FIG. 14 is a further perspective view of the embodiment of FIG. 8, with the lid omitted.
Figure 15:
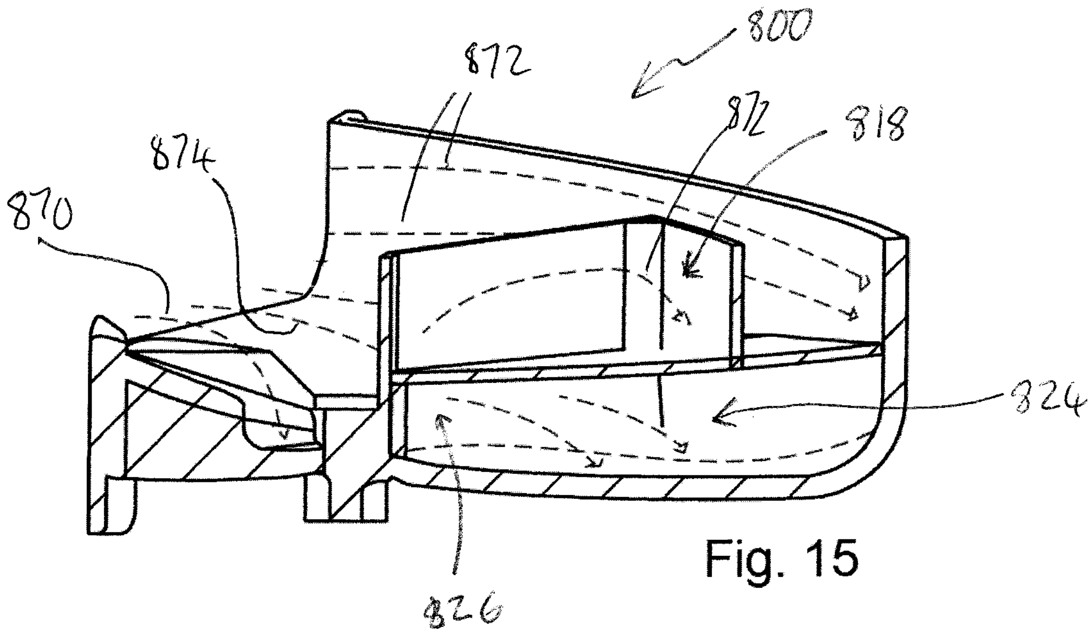
FIG. 15 is a cross sectional view on XV-XV of FIG. 14.
Figure 16:
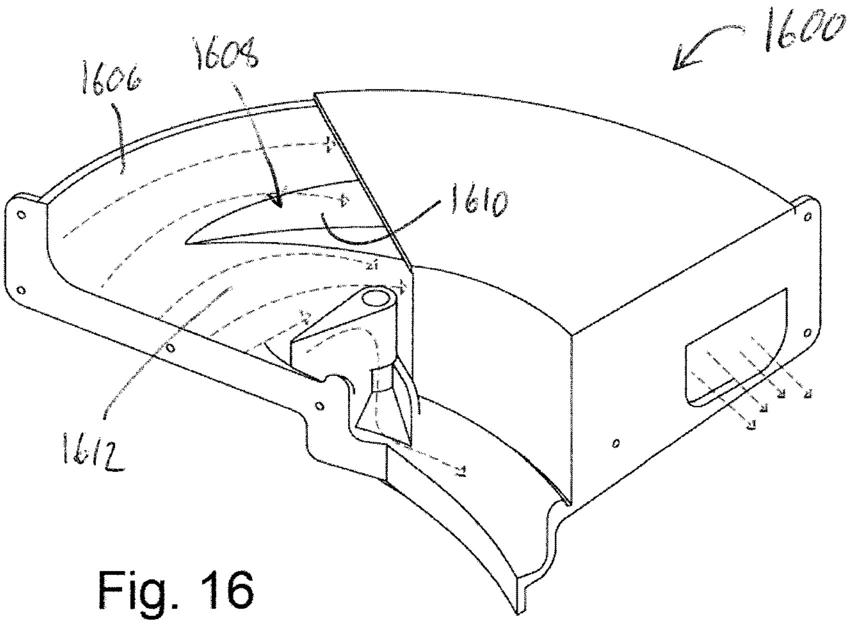
FIGS. 16 to 19 illustrate a second embodiment of a slurry preparation apparatus, with FIG. 19 being a cross sectional view on A-A of FIG. 18.
Figure 17:
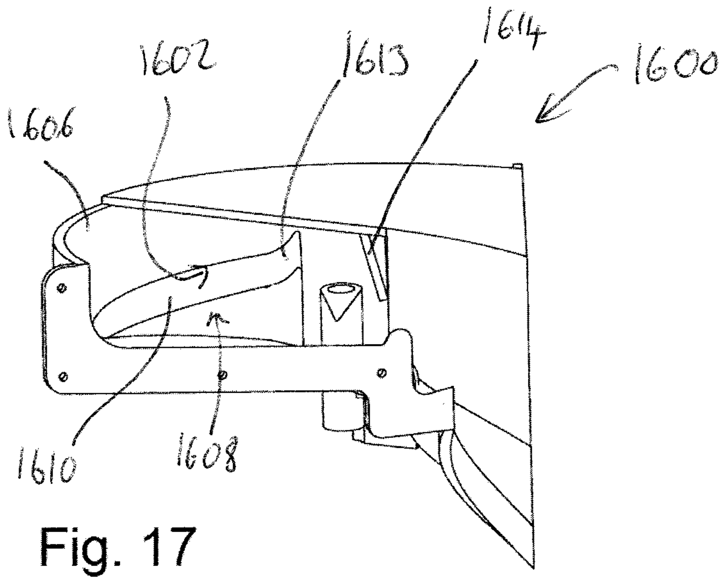
Figure 18:
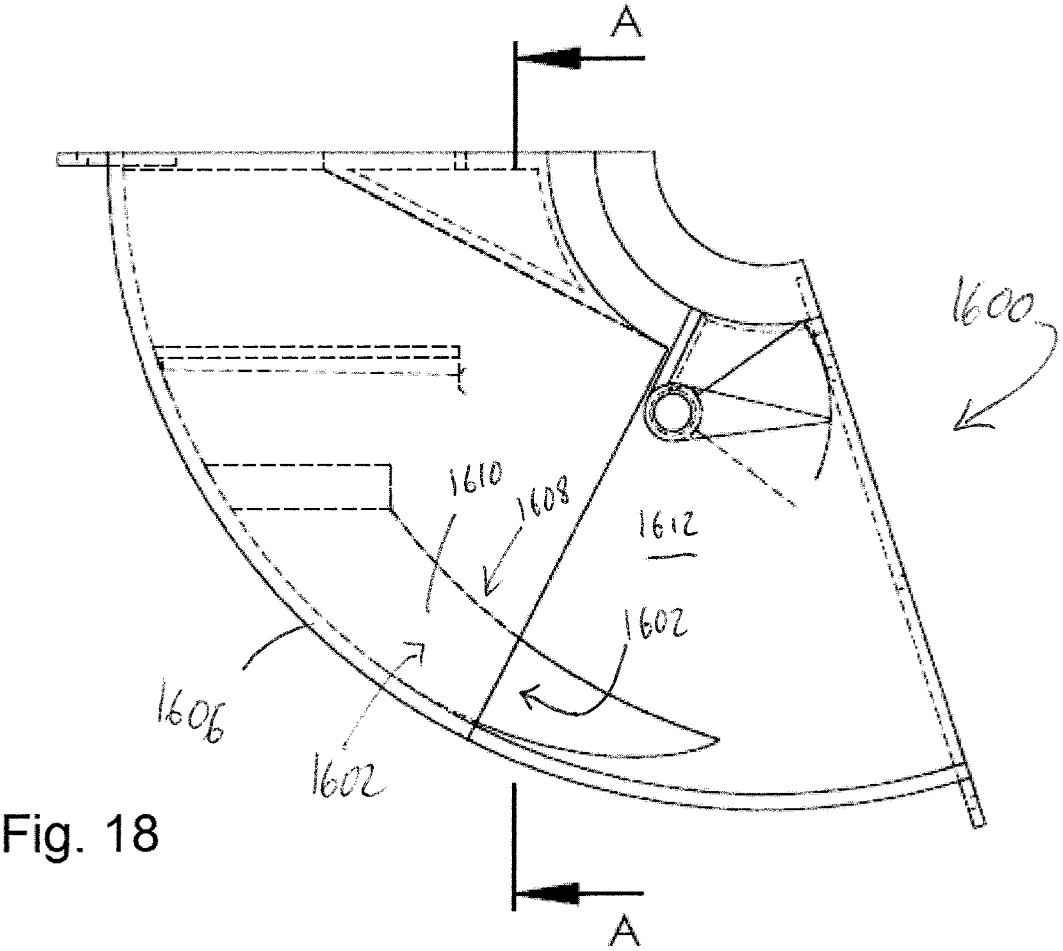
Figure 19:
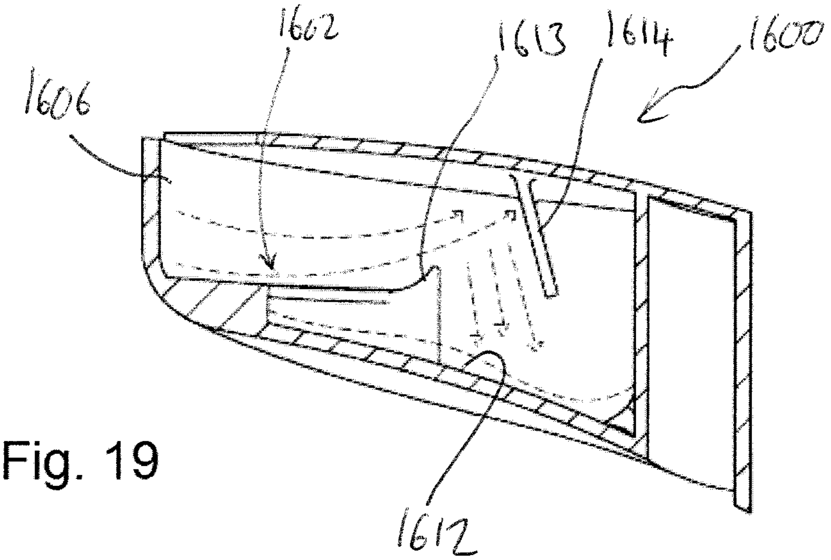
Figure 20:
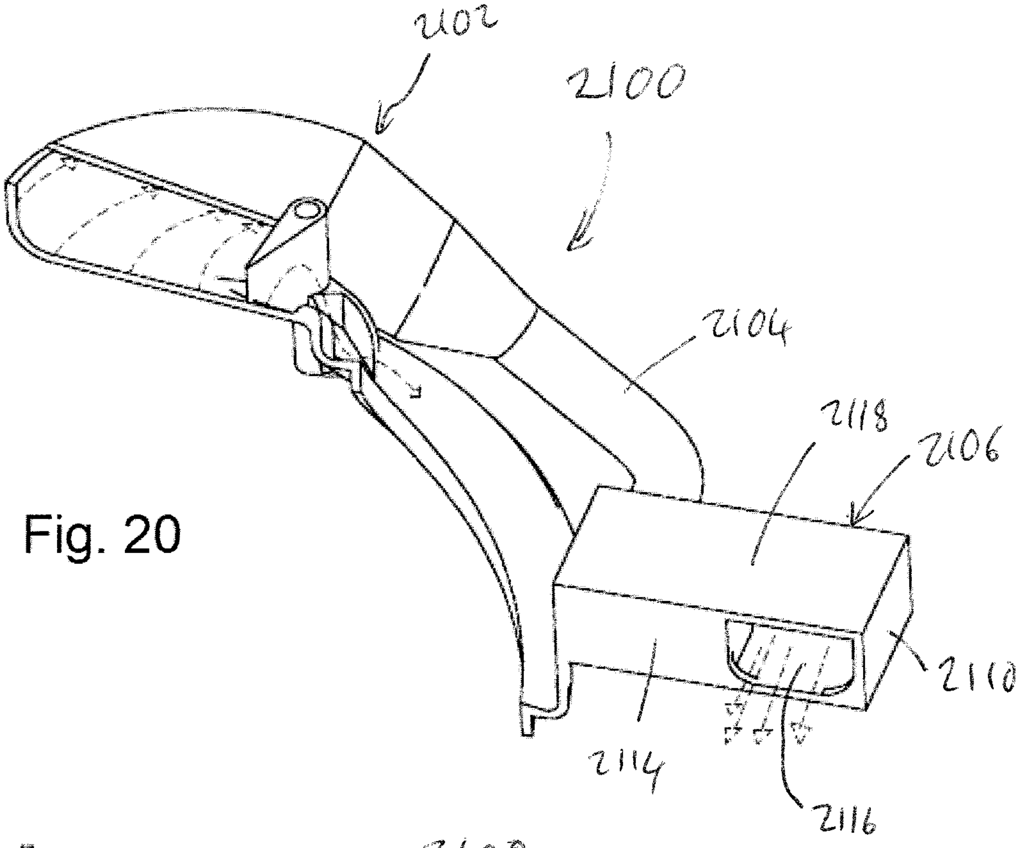
FIGS. 20 to 22 illustrate a third embodiment of a slurry preparation apparatus, with FIG. 22 being a cross sectional view on C-C of FIG. 21.
Figure 21:
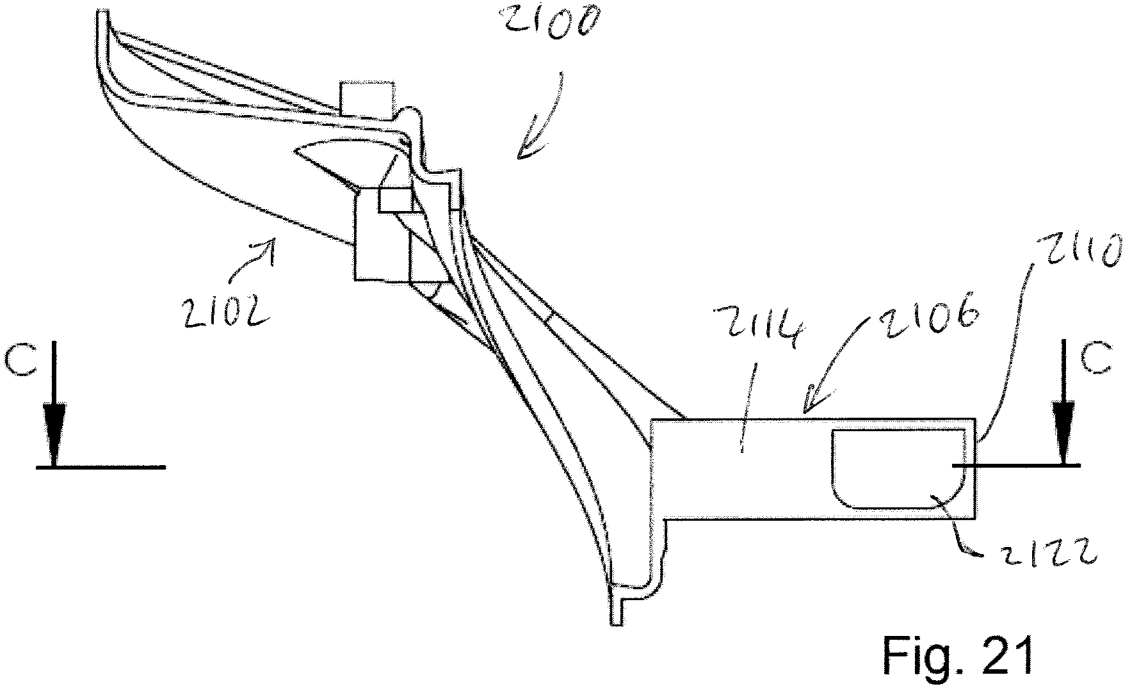
Figure 22:
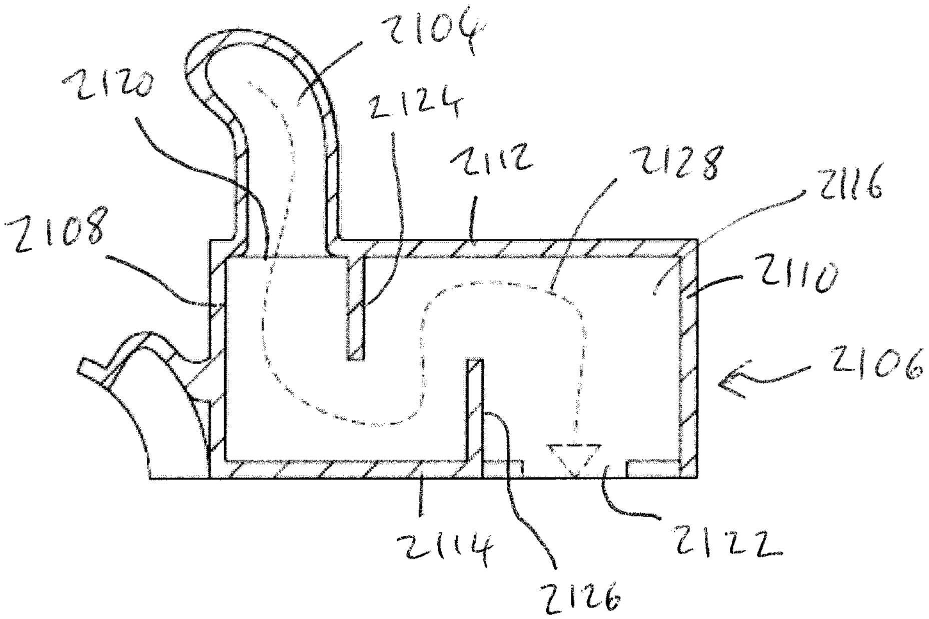

It should be appreciated that the broken line arrows in FIGS. 10, 11 and 15 are intended to schematically illustrate flow of the slurry through the slurry preparation apparatus 800 in use. Broadly: broken line arrows designated 870 indicate flow of the concentrate stream (into concentrate gutter 810); broken line arrows 872 indicate flow of the more fluid stream from the more upstream trough; broken line arrows 874 indicate flow of the of less fluid stream, which in this example is the high solid content middling stream from the more upstream trough; and broken line arrows 876 indicate flow of the prepared, mixed and low energy slurry for entry onto the next-stage trough. The broken line designated 878 in FIG. 13 illustrates schematically an example of a slurry profile of slurry leaving amore upstream trough.

With reference to FIGS. 16 to 20 an alternative embodiment of a slurry preparation apparatus 1600 will now be described. The slurry preparation apparatus 1600 is similar in many respects to the slurry preparation apparatus 800, and the following description will focus on the differences.

The main difference is that the slurry preparation apparatus 1600 does not include a circuitous passageway for dissipating energy from the high-velocity water stream, but rather provides a relatively short open channel or passageway 1602, which substantially follows the path of an upstanding radially outer wall 1606 (corresponding to upstanding radially outer wall 806 of the slurry preparation apparatus 800). The short open channel or passageway 1602 provides a ramp region 1608 having a floor configuration 1610 which elevates the fluid, high velocity, water stream relative to the high solids middlings stream, which moves along a trough floor 1612. The floor configuration 1610 terminates in an upturned floor part 1613, which directs the fluid, high velocity, water stream upwardly and into a baffle plate 1614, which is spaced above the trough floor 1612, which conveys the high solids content stream from the first (or other upstream) stage. Impact of the fluid, high velocity, water stream with the baffle plate 1614 dissipates the kinetic energy and downstream momentum of the fluid, high velocity, water stream, and the water drops, at low downstream velocity (in what may be regarded as a drop zone) onto the high solids content stream, thereby providing a low energy mixed slurry stream, similar to that previously described.

With reference to FIGS. 21 to 24, a further alternative embodiment of a slurry preparation apparatus 2100 will now be described. The slurry preparation apparatus 2100 does not elevate the fluid, high velocity, water stream relative to the high solids content stream, but rather provides a converging or funnel arrangement 2102 in which the fluid, high velocity, water stream and the high solids content stream are brought together and directed, with a rapid increase in down-spiral slope, into a conduit 2104 which is steeply inclined compared to the down trough slope of radially equivalent parts of the spiral troughs. The steep slope, as well as the early convergence of the fluid, high velocity, water stream with the high solids content stream prevents sanding, or stalling of the high solids content stream. The steep incline of the conduit 2104 (and therefore a floor region of the conduit—not shown) and, desirably of at least part of the converging or funnel arrangement 2102, may be regarded as a drop zone which facilitates mixing of the fluid, high velocity, water stream with the high solids content stream.

The conduit 2104 channels the combined slurry into an energy dissipation box 2106.

The energy dissipation box 2106, comprises a radially inner wall 2108, a radially outer wall 2110, an upstream wall 2112, a downstream wall 2114, a floor 2116 and a top or upper cover wall part 2118. The upstream wall 2112 provides a radially inner inlet 2120 of the energy dissipation box 2106 which is in fluid connection with a lower end of the conduit 2104, for feeding of the mixed, but still relatively high energy slurry into the energy dissipation box 2106. The downstream wall 2114 provides a radially outer, outlet opening 2122 for egress of prepared mixed slurry onto a downstream spiral trough.

The energy dissipation box 2106 also provides a plurality of internal baffles 2124, 2126 therein, and provides a circuitous path 2128 therethrough, between the inlet 2120 and the outlet opening 2122. The circuitous path 2128 is defined by the defined by the internal baffles 2124, 2126, the walls 2108, 2110, 2112, 2114, and the floor 2116 and a top or upper cover wall part 2118. Impacts of the slurry flow with these parts and turbulence in the slurry flow effectively dissipate kinetic energy and downstream momentum of the combined slurry.

The energy dissipation box 2106 thus dissipates kinetic energy and downstream momentum of the combined slurry (and therefore, also of the water from the fluid, high velocity, water stream) allowing egress of a low-energy, mixed, slurry stream, similar to that previously described. It should be appreciated that an energy dissipation box similar or identical to the energy dissipation box 2106, may be used as a feedbox at the very top of the spiral.

Figure 23:
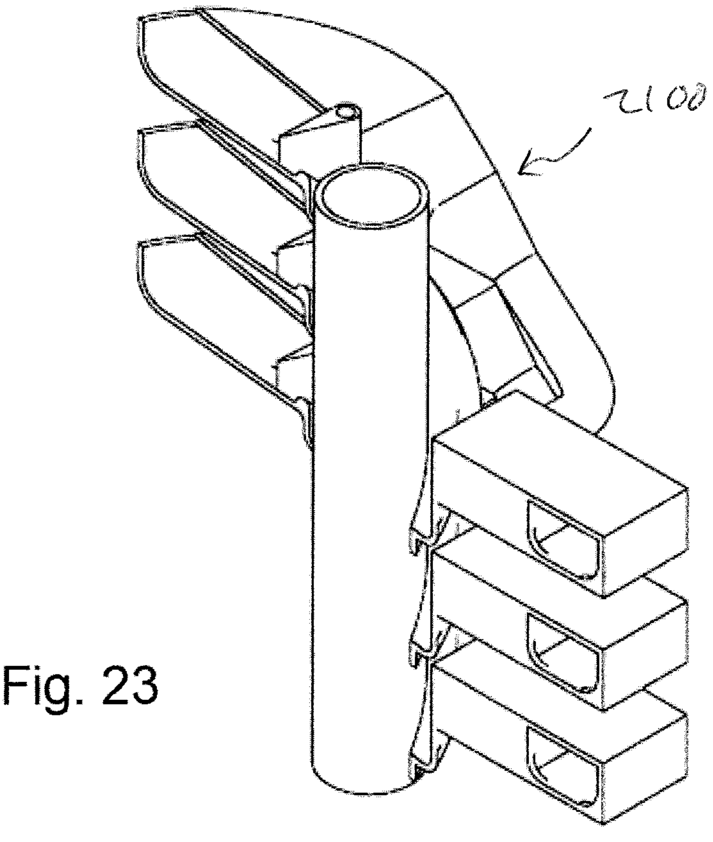
FIG. 23 illustrates use of the embodiment of FIGS. 20 to 22 in a multiple-start spiral separator.

FIG. 23 illustrates how a slurry preparation apparatus 2100 can be provided in each of multiple spirals without the slurry preparation apparatus 2100 of any spiral interfering with the slurry preparation apparatus 2100 of any spiral.

Indicative testing of embodiments substantially as described above has been performed and suggests that substantial improvements in separation efficiency can be achieved compared to at least some known configurations of spiral separator, in wet gravity separation of heavy minerals.

Figure 24:
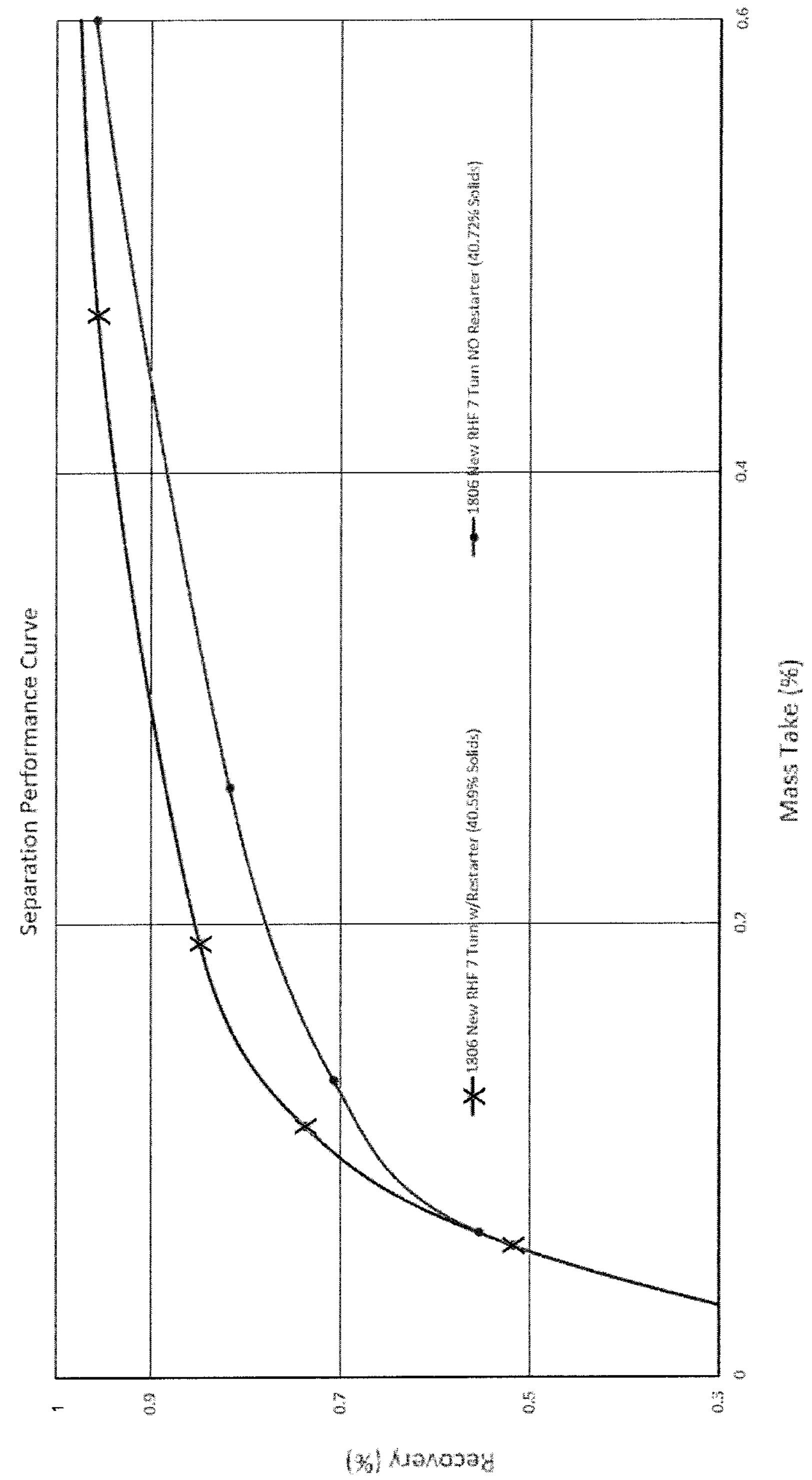
FIGS. 24 to 26 are comparative separation performance curves comparing separation including the teaching of the present disclosure with other approaches.
Figure 25:
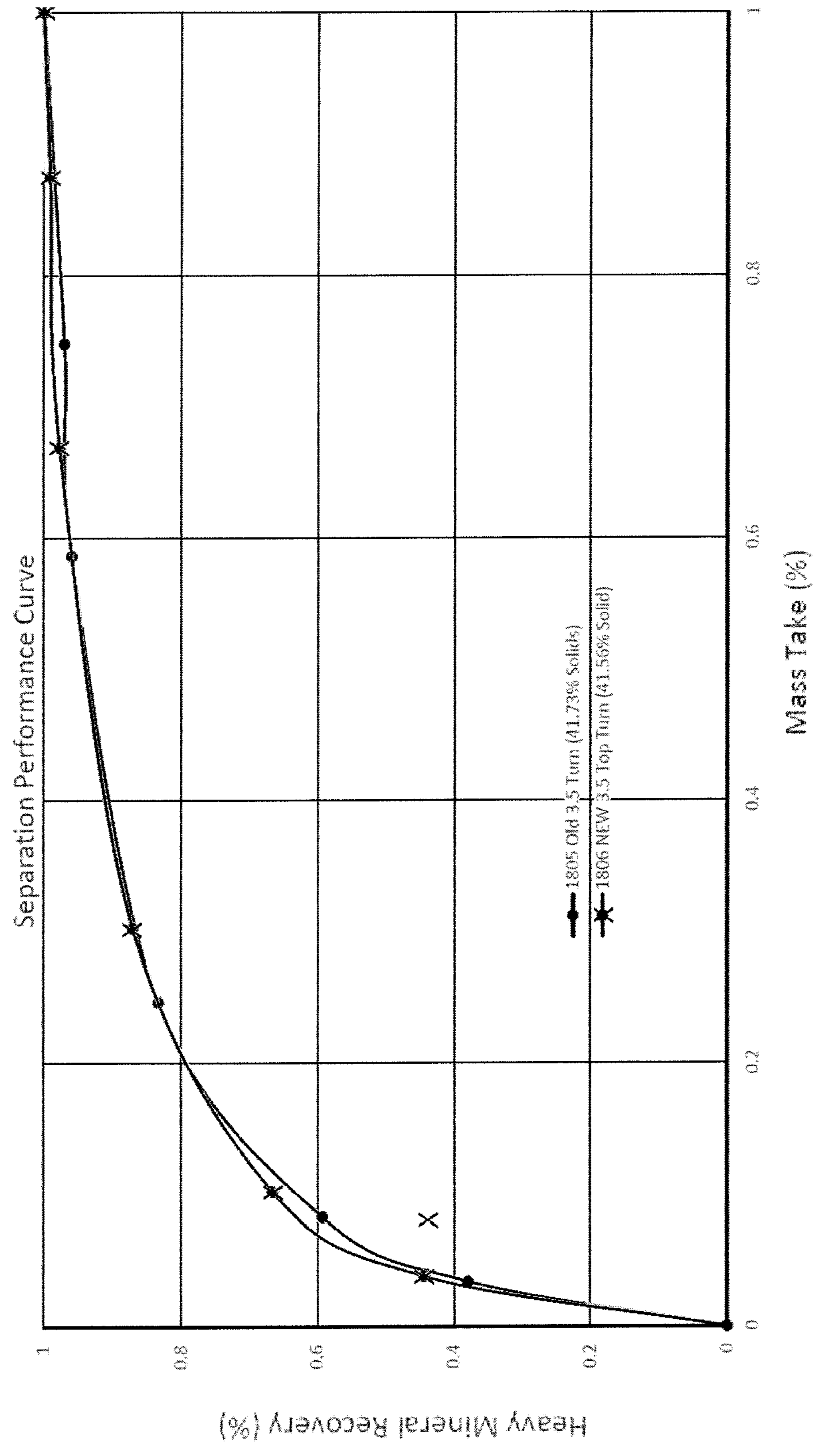
Figure 26:
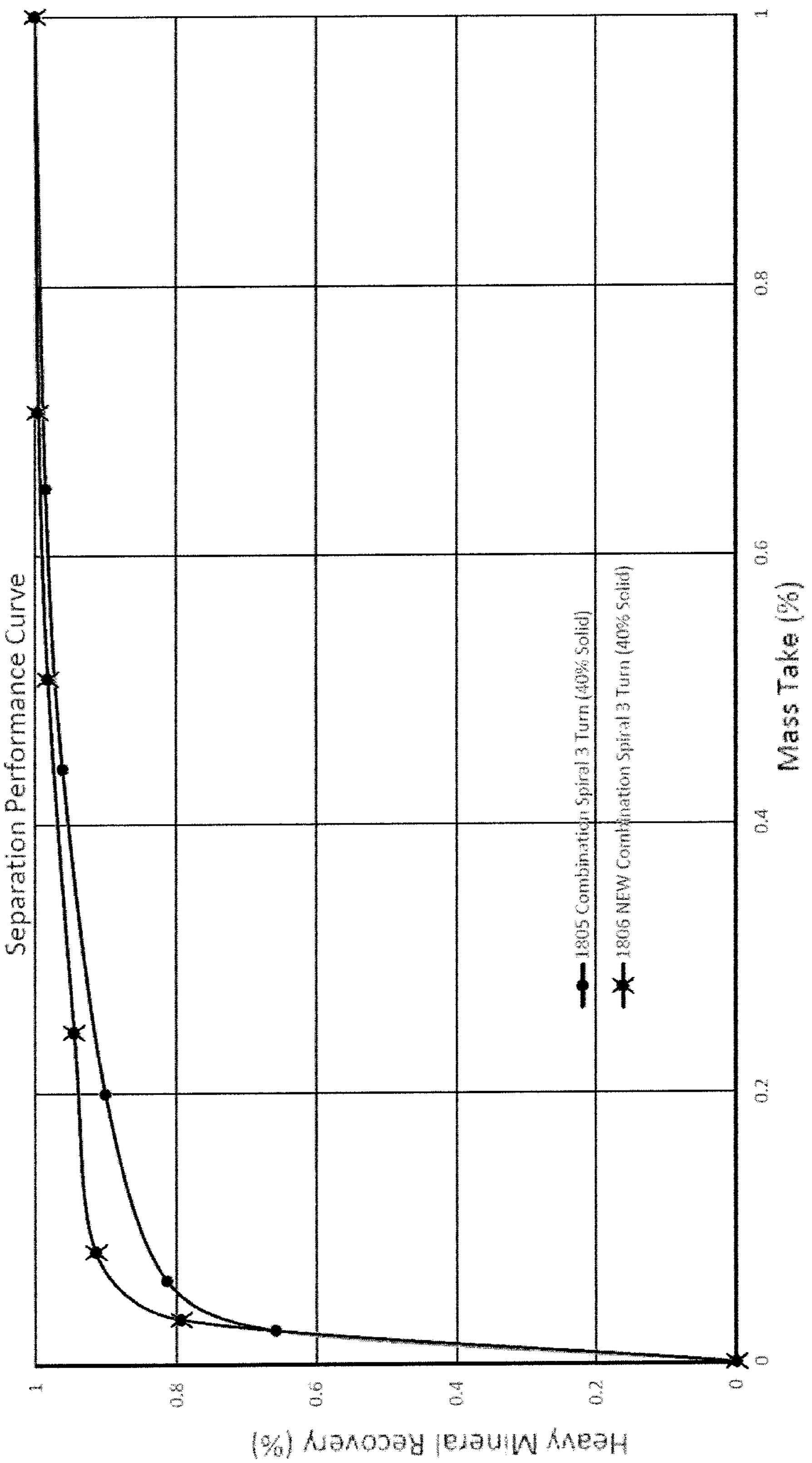

FIGS. 24 to 26 show comparative separation performance curves for spiral separators incorporating at least some of the present disclosure in comparison with spiral separators not incorporating teachings of the present disclosure.

FIG. 24 shows comparative separation performance curves for the spiral trough configuration substantially as illustrated in, and described in relation to, FIGS. 1(*b*) to 6, that is with for a spiral comprising two troughs each of 3.5 turns, and each substantially corresponding to the trough 100, with and without slurry preparation apparatus. The higher curve represents separation performance with a slurry preparation apparatus substantially corresponding to the slurry preparation apparatus 800 provided between the two troughs. The lower curve represents same trough configuration, but without the slurry preparation apparatus 800 between the troughs. Rather, a corresponding quarter turn trough, without provision for mixing and energy/momentum dissipation was used to connect the two troughs.

In each of FIGS. 25 and 26, the higher curve is a separation performance curve for the 3.5 turn spiral trough configuration substantially as illustrated in, and described in relation to, FIGS. 1(*b*) to 6. The lower curve in each of FIGS. 25 and 26 is for a 3.5 turn trough of reducing angle of cross-trough floor slope from top to bottom (generally following the teachings of Wright), that is, not having the more gradual reductions in cross-trough slope in the higher turns and the more rapid reduction in cross trough slope in the final turn before concentrate offtake. FIGS. 25 and 26 differ because they show separation performance curves for two different minerals, one easy to separate and one hard to separate.

It can be seen that the teachings of the present disclosure appear to provide commercially significant benefits in separation performance.

The variation in cross sectional angle of the trough floor in the described embodiments, departs markedly from the teachings of U.S. Pat. Nos. 4,324,334 and 4,563,279. Indeed, the progressive relatively gentle reduction in the floor angle, followed by a relatively rapid and sudden reduction in floor angle in the final turn before the split, as described above in relation to the preferred embodiments, is considered to be in direct opposition to the teaching in U.S. Pat. Nos. 4,324,334 and 4,563,279. These patents teach that the initial variation in floor angle should relatively large—a reduction in cross sectional angle first from 21 degrees to 15 degrees after two or more turns of the spiral with a 21 degree angle—and that subsequent reductions in floor angle should be relatively gentle—from 15 degrees to 12 degrees for one later turn, and then from 12 degrees to 9 degrees for one subsequent later turn, immediately before the different streams (concentrate, millings and tailings) are split.

This is more than a mere numerical difference. U.S. Pat. Nos. 4,324,334 and 4,563,279 are considered to teach an initial, relatively rapid braking of the pulp flow, and then continued but significantly more gentle braking. In contrast, the principle adopted in at least described embodiments of the present disclosure is to provide a relatively gentle reduction in cross sectional slope of the trough floor in upstream turns followed by a substantially larger reduction in floor angle at the final turn immediately before splitting of the concentrate band.

Further the substantially larger reduction in floor angle reduces the floor angle itself to an angle smaller than the smallest floor angle disclosed in either of U.S. Pat. Nos. 4,324,334 and 4,563,279. The disclosed configuration is believed to result in a 'tipping off' of the non-desired mineral. Further the disclosed configuration is believed (compared to the teaching of Wright) to reduce uncontrolled and un-damped water flow down the spiral which is characteristic of steep cross-trough profiles, by starting relatively flatter but not flattening as quickly.

The shallow cross-trough floor angle in the final turn of described embodiments is believed to result in a beneficial panning or tipping off effect as described herein.

Thus instead of looking to optimise the braking effect taught by Wright, embodiments disclosed herein instead aim to achieve or maximise a tipping off or 'panning' effect to improve separation performance. In so doing, the rate of reduction in cross-trough floor slope angle increases markedly towards the end of the spiral trough, in contrast to the initial rapid reduction and subsequent more gradual reduction taught by Wright.

Further—and importantly—U.S. Pat. No. 4,324,334 describes at col 5 lines 7 to 15, that a variation for difficult separations is to not reduce the cross trough floor slope over the bottom two turns at all. This is in stark contrast to embodiments disclosed herein, in which a relatively large reduction in cross trough floor slope over the bottom turn is important.

The described embodiments can result in an effective spiral separator, for example for metal mineral sands, in which a reduced number of turns (about 3.5 turns in the described embodiments) can result in commercially useful separation performance. This is in contrast to the standard industry practice of using spiral separators of five to seven turns (or five to seven turns per 'stage' in multiple stage separators).

Embodiments of the slurry preparation apparatus disclosed herein are believed to provide a refreshed or 'restarted' slurry which can significantly improve separation performance in a second or subsequent stage of a spiral separator. Further, embodiments are believed to desirably dissipate energy in a slurry, prior to further treatment of the slurry, without undue risk of causing stalling of the flow or sanding in the spiral trough. However, it should be noted that some testing has indicated that use of other, previously known, types of slurry preparation apparatus, between stages of spiral separator with trough configurations in accordance with the present disclosure, can provide results which are, at least in some cases, better than those provided by, for example, the slurry preparation apparatus 800. For example, using a conventional repulper provided on the trough outer wall to deflect water (and small amounts of entrained particulates) from the region of the trough outer wall into the denser slower moving particulate stream in the intermediate region of the trough, has been found to provide good results in the immediately following stage. Accordingly, it is envisaged that the trough configurations in accordance with the present disclosure, may be used effectively with such conventional slurry preparation apparatus.

Of course, the above features or functionalities described in relation to the embodiments are provided by way of example only. Modifications and improvements may be incorporated without departing from the scope of the invention.

The claims defining the invention are as follows:

1. A spiral separator for separating more-desired material from less-desired material, the spiral separator comprising:

a feed arrangement for feeding a slurry of mixed more-desired material and less-desired material;

a spiral trough; and a splitting arrangement for off-take of a concentrate band of more desired material;

wherein the spiral trough is configured to provide a trough floor region with an effective cross-trough floor slope which reduces by between 5 and 8 degrees in a turn immediately upstream of the splitting arrangement; and wherein at least some of the turn immediately upstream of the splitting arrangement comprises a concentrate refiner region, in which the concentrate band of the slurry is refined by radially outward migration of less-desired material from the concentrate band.

2. The spiral separator in accordance with claim 1, wherein the concentrate refiner region provides a cross-trough floor angle such that a balance of centrifugal and gravitational forces on the concentrate band is such that both the more-desired and less-desired materials would, if the balance of forces were maintained, migrate outwardly;

wherein the apparatus provides a refinement part of the concentrate refiner region at which least some of the less-desired material has migrated outwardly from a radial position corresponding to that of a preliminary concentrate band, and at which no substantial amount of the more-desired material has migrated substantially outwardly due to the balance of centrifugal and gravitational forces, so that a refined concentrate band is provided at the refinement part; and wherein the splitting arrangement is provided at or immediately downstream of the refinement part to split the refined concentrate band from the rest of the slurry in the spiral trough.

3. The spiral separator in accordance with claim 1, wherein the trough is configured to provide the trough floor region with an effective cross-trough floor slope of between 4 and 8 degrees from horizontal in a turn immediately upstream of the splitting arrangement.

4. The spiral separator in accordance with claim 1, wherein the trough is configured to provide a feed transition zone proximal to the feed arrangement, wherein at least part of the feed transition zone provides a floor region with an effective cross-trough floor slope of between 16 and 20 degrees from horizontal, and wherein the floor region with an effective cross-trough floor slope of between 16 and 20 degrees from horizontal is provided within 1.5 turns of the feed arrangement.

5. The spiral separator in accordance with claim 4, wherein the feed transition zone provides a region in which a cross sectional shape of the trough transitions gradually from providing a relatively narrow feed entry channel, adjacent a radially outer part of the trough, to providing a substantially full width floor profile with an effective cross-trough floor slope of between about 15 and about 20 degrees, and wherein the relatively narrow feed entry channel has a floor part with cross-trough floor slope less than 12 degrees.

6. The spiral separator in accordance with claim 4, wherein the trough is configured to provide an effective cross-trough floor slope which reduces at a mean rate of between 2 and 4 degrees per turn for at least one further turn in an intermediate zone downstream of the feed transition zone and upstream of the concentrate refiner region.

7. The spiral separator in accordance with claim 1, wherein the trough extends between about 2.5 turns and about 4.5 turns between a slurry feed point and a concentrate off-take point, and comprises a modular trough unit, providing between about 2.5 turns and about 4.5 turns.

8. The spiral separator in accordance with claim 1, wherein the trough provides a helical pitch of between 35 and 50 cm and has a helical diameter of between 50 and 75 cm.

9. The spiral separator in accordance with claim 1, wherein the trough provides an effective cross-trough floor slope which reduces between an upstream region thereof and a downstream region thereof, and wherein the reduction in effective cross-trough floor slope in a turn at a downstream region of the spiral trough is provided by the pitch of a more radially outer region of the spiral trough and the pitch of a more radially inner region of the trough being different over said turn of the spiral trough, and wherein the difference in pitch over said turn is between 0.08 and 0.18 times the radial distance between said more radially outer region and said more radially inner region.

10. The spiral separator in accordance with claim 1, wherein the spiral separator is a spiral separator for wet gravity separation of minerals.

11. The spiral separator in accordance with claim 1, wherein the spiral separator comprises at least two stages, at least two stages each comprising: a respective feed arrangement for feeding a slurry of mixed more-desired material and less-desired material; a respective spiral trough; a respective splitting arrangement for off-take of a concentrate band of more desired material; and wherein in at least two stages the spiral trough is configured to provide a respective trough floor region with an effective cross-trough floor slope which reduces by between 5 and 8 degrees in a turn immediately upstream of the respective splitting arrangement.

12. The spiral separator in accordance with claim 11, wherein the feed arrangement of at least one second or subsequent stage comprises a slurry preparation apparatus which comprises a mixing region for mixing material from a more fluid stream of a slurry flow exiting a more upstream stage with material from a less fluid stream of the slurry flow exiting the more upstream stage prior to feeding mixed prepared slurry into said second or subsequent stage, and an energy dissipation region to reduce kinetic energy of at least a substantial amount of material from a more fluid stream of a slurry flow exiting a more upstream stage, to thereby reduce the downstream velocity of said at least part of the more fluid stream.

13. A spiral separator for providing at least partial separation of a first species and a second species, the spiral separator comprising at least two stages comprising at least a more upstream stage and a more downstream stage, each of said more upstream and more downstream stages comprising:

a feed arrangement;

a spiral trough comprising a more upstream region and a more downstream region; and a splitting arrangement for off-take of a concentrate band of more desired material;

wherein the feed arrangement of each of the more upstream and more downstream stages is, in use, arranged to feed a feed slurry comprising a mix of said first species and said second species into the more upstream region of the respective spiral trough at a feed entry region of the respective spiral trough;

wherein the more upstream region of the respective spiral trough of each of the more upstream and more downstream stages has a trough floor region, and provides an effective cross-trough floor slope relative to the horizontal, which reduces from a cross-trough floor angle of between 15 and 20 degrees to a cross-trough floor angle of between 10 degrees and 14 degrees;

wherein the more downstream region of the respective spiral trough has a trough floor region having an effective cross-trough floor angle which reduces to between 4 degrees and 8 degrees, relative to the horizontal;

wherein the splitting arrangement of each of the more upstream and more downstream stages is provided at or immediately adjacent the said trough floor region having an effective cross-trough floor angle which reduces to between 4 degrees and 8 degrees, to split a concentrated band of the first species from the rest of the flow in the respective spiral trough; and wherein the feed arrangement of the more downstream stage comprises a slurry preparation apparatus, comprising a mixing region for mixing material from a more fluid stream of a slurry flow exiting a stage upstream of the more downstream stage with material from a less fluid stream of the slurry flow exiting said stage upstream of the more downstream stage, prior to feeding mixed prepared slurry into said more downstream stage.

14. The spiral separator in accordance with claim 13, wherein in the spiral trough of each of the more upstream and more downstream stages, a downstream end of the more upstream region is connected to an upstream end of the more downstream region.

15. The spiral separator in accordance with claim 13, wherein in the more upstream region of the spiral trough of each of the more upstream and more downstream stages, at least part of a region which has said effective cross-trough floor angle relative to the horizontal, of between 15 and 20 degrees, is provided at a position within 1.5 turns from the feed entry region.

16. The spiral separator in accordance with claim 13, wherein, in the more upstream region of the spiral trough of each of the more upstream and more downstream stages, said reduction in effective cross-trough floor angle occurs at rate of between 2 degrees reduction in angle and 4 degrees reduction in angle, over at least one turn of the more upstream region of the spiral trough.

17. The spiral separator in accordance with claim 16, wherein, in the more upstream region of the spiral trough of each of the more upstream and more downstream stages, said reduction in effective cross-trough floor angle occurs at rate of between 2 degrees reduction in angle and 4 degrees reduction in angle, over each of at least two turns of the more upstream region of the spiral trough.

18. A spiral trough for use in a spiral separator for providing at least partial separation of a first species and a second species by wet gravity separation, the spiral trough comprising:

a more upstream region, the more upstream region comprising a slurry feed region adapted, in use, to receive a feed slurry comprising a mix of said first species and said second species from a feed arrangement of said spiral separator; and a more downstream region, adapted to be provided in said spiral separator with a splitting arrangement provided at or immediately adjacent the more downstream region, to split a concentrated band of the first species from the rest of the flow in the spiral trough;

wherein the more upstream region of the spiral trough has a trough floor region, and provides an effective cross-trough floor slope relative to the horizontal, which reduces from between 15 and 20 degrees to a cross-trough floor angle of between 10 degrees and 14 degrees;

wherein the more downstream region of the spiral trough has a trough floor region having an effective cross-trough floor angle which reduces to between 4 degrees and 8 degrees, relative to the horizontal, immediately adjacent a downstream end of the spiral trough; and wherein the trough provides an effective cross-trough floor slope which reduces between the more upstream region and the more downstream region, and wherein the reduction in effective cross-trough floor slope in a turn at the downstream region of the spiral trough is provided by the pitch of a more radially outer region of the spiral trough and the pitch of a more radially inner region of the trough being different over said turn of the spiral trough, and wherein the difference in pitch over said turn is between 0.08 and 0.18 times the radial distance between said more radially outer region and said more radially inner region.

19. A spiral separator for separating more-desired material from less-desired material, the spiral separator comprising:

a feed arrangement for feeding a slurry of mixed more-desired material and less-desired material;

a spiral trough; and a splitting arrangement for off-take of a concentrate band of more desired material;

wherein the spiral trough is configured to provide a trough floor region with an effective cross-trough floor slope which reduces by between 5 and 8 degrees in a turn immediately upstream of the splitting arrangement; and wherein the trough provides an effective cross-trough floor slope which reduces between a more upstream region of the trough and a more downstream region of the trough, and wherein the reduction in effective cross-trough floor slope in a turn at the downstream region of the spiral trough is provided by the pitch of a more radially outer region of the spiral trough and the pitch of a more radially inner region of the trough being different over said turn of the spiral trough, and wherein the difference in pitch over said turn is between 0.08 and 0.18 times the radial distance between said more radially outer region and said more radially inner region.

* * * * *